United States Patent
Manto

(10) Patent No.: US 6,788,771 B2
(45) Date of Patent: *Sep. 7, 2004

(54) SYSTEM AND METHOD FOR PROVIDING SPONSORED OR UNIVERSAL TELECOMMUNICATIONS SERVICE AND THIRD PARTY PAYER SERVICES

(75) Inventor: Charles L. Manto, Annapolis, MD (US)

(73) Assignee: FreeTech, L.L.C., Annapolis, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/234,840

(22) Filed: Sep. 5, 2002

(65) Prior Publication Data

US 2003/0076940 A1 Apr. 24, 2003

Related U.S. Application Data

(63) Continuation-in-part of application No. 09/942,930, filed on Aug. 31, 2001, now Pat. No. 6,285,749.

(51) Int. Cl.$^7$ .............................................. H04M 15/00
(52) U.S. Cl. ............................. 379/114.05; 379/114.01; 379/114.03; 379/114.1; 379/114.21; 379/114.23
(58) Field of Search ........................... 379/111, 114.01, 379/114.03, 114.05, 114.1, 114.12, 114.15, 114.2, 114.21, 114.22, 114.23, 114.24, 114.25, 114.26, 115.01, 121.01, 144.01, 144.02, 188, 201.01, 201.02

(56) References Cited

U.S. PATENT DOCUMENTS

| | | | | |
|---|---|---|---|---|
| 5,146,491 A | * | 9/1992 | Silver et al. ........... | 379/114.24 |
| 5,187,710 A | * | 2/1993 | Chau et al. ............ | 370/524 |
| 5,359,642 A | * | 10/1994 | Castro .................... | 379/121.01 |
| 5,579,379 A | * | 11/1996 | D'Amico et al. ........ | 379/114.01 |
| 5,666,405 A | * | 9/1997 | Weber .................... | 379/127.03 |
| 5,822,411 A | * | 10/1998 | Swale et al. ............ | 379/114.22 |
| 5,903,882 A | * | 5/1999 | Asay et al. ............. | 705/44 |
| 5,950,174 A | * | 9/1999 | Brendzel ................ | 705/34 |
| 6,285,749 B1 | * | 9/2001 | Manto ..................... | 379/114.23 |
| 6,381,317 B1 | * | 4/2002 | Bala et al. ............. | 379/114.23 |
| 6,584,183 B2 | * | 6/2003 | Manto ..................... | 379/114.05 |
| 6,601,037 B1 | * | 7/2003 | Kolls ...................... | 705/14 |

* cited by examiner

Primary Examiner—Quoc D. Tran
(74) Attorney, Agent, or Firm—Greenberg Traurig, LLP; Richard E. Kurtz, II

(57) ABSTRACT

A method of operating a telecommunications device wherein the telecommunications device is used to detect an outgoing call from a calling party to a called number. The calling number is used to determine whether or not the calling party is a universal service user. If it is determined that the called number is among a class of numbers exempt from charges, the call is connected. A determination on the sufficiency of funds in a pre-paid account is made. If it is determined that there are insufficient funds in a pre-paid account to cover charges associated with the outgoing call, a message is generated and sent to the calling party or a third party requesting authorization to charge an additional fee for connecting the calling party with the called party and providing related information or application services. User input is received from the calling party, indicating the calling party's authorization of such charge. The connection between the calling party and the called party is made. In an alternative embodiment, costs for providing data communications and related application services between an initiating party and a universal service user are calculated, in response to a request by the initiating party, in accordance with the network elements required for a requested quality of service.

20 Claims, 13 Drawing Sheets

Service Assessment Routine

Illustration of layered sponsored services

SYSTEM AND METHOD FOR PROVIDING SPONSORED OR UNIVERSAL TELECOMMUNICATIONS SERVICE AND THIRD PARTY PAYER SERVICES

This application is a continuation-in-part of U.S. patent application Ser. No. 09/942,930, filed Aug. 31, 2001, now U.S. Pat. No. 6,285,749 the entire disclosure of which is incorporated herein by reference.

This application includes material which is subject to copyright protection. The copyright owner has no objection to the facsimile reproduction by anyone of the patent disclosure, as it appears in the Patent and Trademark Office files or records, but otherwise reserves all copyright rights whatsoever.

FIELD OF THE INVENTION

The present invention relates in general to the field of voice and data communications, and in particular to a novel system for providing sponsored or universal communications services.

BACKGROUND OF THE INVENTION

Over the years, worldwide consideration has been given to the universal service problem—the desirability of providing telephone service to those who cannot afford to pay and maintain telephone service. Networks are significantly more valuable as more users are able to use the network, and the lack of universal service is a barrier to economic participation by those lacking service. Societal benefits of having even the poorest on the public telecommunications network are so significant that the new U.S. Telecommunications Act of 1996 makes special provisions for universal service as part of the Act, including mechanisms to implement subsidized activities. Many states have life-line services which subsidize telecommunications services for users who meet certain low income tests.

Internationally, there are even larger universal service problems as nations such as the Philippines, China, and the republics of the former Soviet Union try to entice investment in their respective telecommunications infrastructures. In these emerging markets, the number of telecommunications lines per capita is much smaller. Because market-based solutions to the universal service problem in these markets are lacking, capital for network infrastructure is limited.

Furthermore, there are applications that provide financial incentives to sponsors so that they would provide free communication services and free applications to their sponsored users. Enabling these applications and services to be provided to users exempt from charges could make it possible to grow the capabilities and reach of public and private networks.

Therefore, there is a need for an improved apparatus and operating methodology that provides a market-based solution to the universal service problem.

SUMMARY OF THE INVENTION

In a preferred embodiment, the invention provides a novel and substantial solution to the problem of providing phone service for those without proven means to pay or enables sponsors wishing to pay on behalf of others, by providing, voice, data, and multi-media services. The invention provides an apparatus and a related method for controlling public network switching activity or private or virtual private networks in a manner which makes it possible to provide universal service, of telephone, data, multimedia line or services, whether land, satellite, mobile or phone card based and, accompanying applications to a party without charge, and providing metered billing to persons wishing to contact the party. This method effectively provides universal service for telecommunications voice and/or multimedia applications, without tax or market subsidies. For the purposes of the present invention, the universal service user is also defined as an "exempt" user or "sponsored" user, and the services are alternately referred to as "universal service," "exempt service," or "sponsored service." "Call" is used either as a voice, data, or multimedia contact.

BRIEF DESCRIPTION OF THE DRAWINGS

The foregoing and other objects, features, and advantages of the invention will be apparent from the following more particular description of preferred embodiments as illustrated in the accompanying drawings, in which reference characters refer to the same parts throughout the various views. The drawings are not necessarily to scale, emphasis instead being placed upon illustrating principles of the invention.

DETAILED DESCRIPTION OF THE PREFERRED EMBODIMENT

Figure 1A:
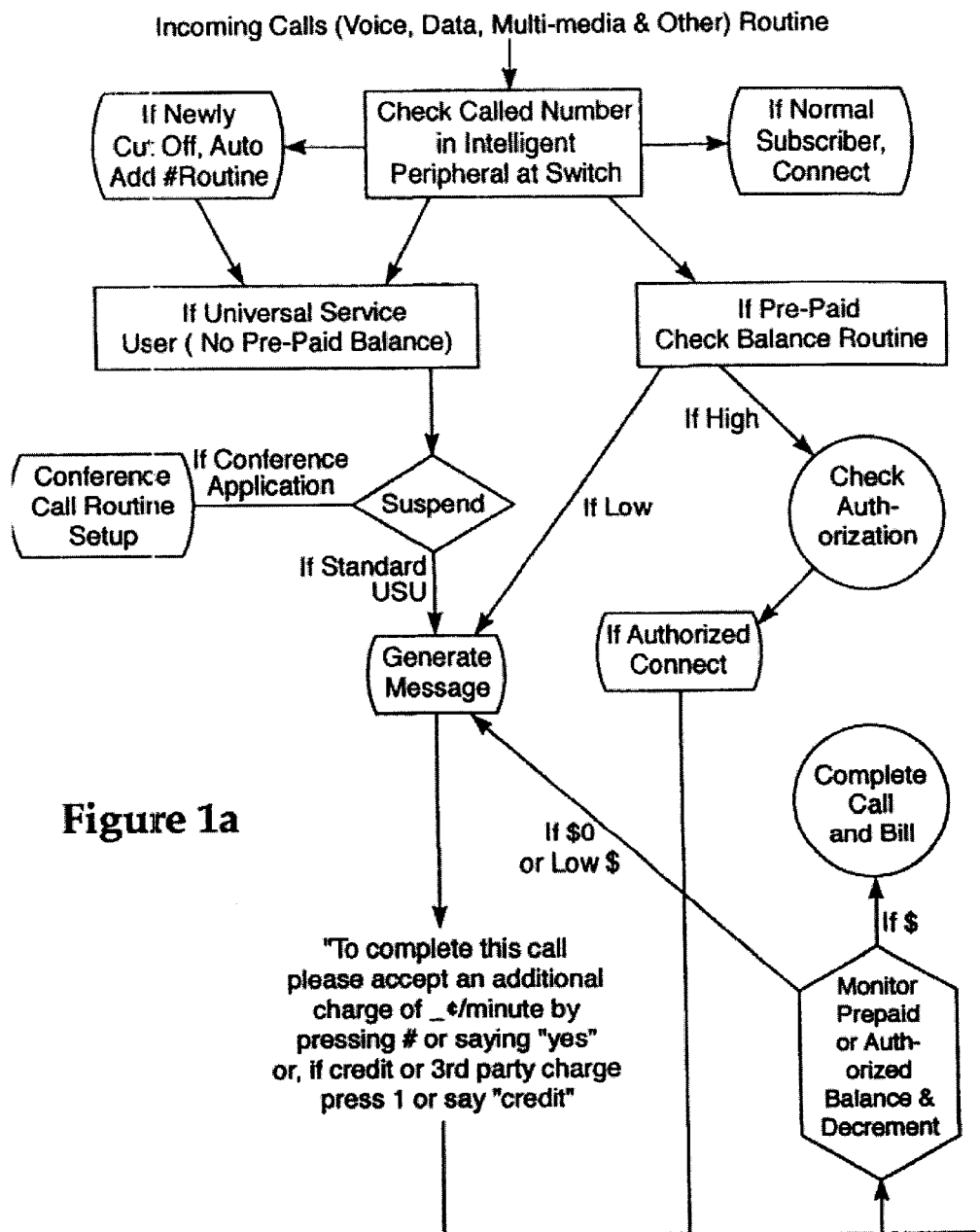
FIG. 1 is a flowchart showing a process for delivering Incoming Calls to a Universal Service User.

Reference will now be made in detail to the preferred embodiments of the present invention, examples of which are illustrated in the accompanying drawings.

The present invention provides software operating in telephone central office switches and/or their intelligent peripherals or in private networks or virtual private networks. Such operating software may also be installed in other network devices for wireline and wireless local loop services and long distance services, in user equipment including switches, PBX's, telephony systems, controlling local area networks, and wide area networks, and to provide universal access to portable telephones, pagers and other electronic communications devices. This includes policy or security servers or remote mass storage systems.

The present invention makes it possible to include far more people in a given network, and also makes it possible to simplify participation of multiple local and long distance service providers in any given market.

The invention will be described in terms of a preferred embodiment in which telephone service is provided that is totally free to the user, yet is paid for by third parties. The invention also makes it possible to provide accompanying applications totally free to the user and paid for by third parties.

However, those skilled in the art will understand that the inventive concepts can be similarly applied to billing and connection services for other communications networks and their accompanying applications, services or products.

This invention further provides a virtual real-time wide-band assessment routine which manages information from network monitoring and management software programs, provisioning systems, telecommunications service activation software programs, service level agreement software programs, and cost model programs that make it possible to know all available last mile network and backbone network alternatives and their pricing and provide it to prospective sponsors on demand so that the sponsoring party can decide whether to commit to pay for the wide bandwidth service. This embodiment is discussed in detail further below.

Whenever a telephone user is about to be cut off from service, the software according to the invention makes it possible to cut the user off from credit incurring calls while still maintaining their service. The software still allows the user to place collect calls, 1-800 or 1-888 calls, 911 calls, or third party charge calls, resulting in revenue to the service provider from third parties. Furthermore, this software will intercept incoming calls before completion and ask the caller to decide if they wish to complete the call to the sponsored user of free service, on the condition that the caller pay an extra premium of, for example, a defined price per minute. When the user accepts this offer and demonstrates ability to pay either through their own credit based phone bill, their pre-paid phone bill, or some other acceptable credit or debit means, then the caller is allowed to complete the call to the user. Once the call is completed, the caller is billed for the additional fee, making it possible for the service provider to the user of free phone service to make a profit, thus providing a market based mechanism to provide universal service. If the caller is a universal service user and cannot pay for the call, the universal service user can either be connected without charge or enter a security code that would allow funds provided by a third party to pay to complete that call or communication, or communicate with the third party in real time to gain the third party payment. This concept is preferably implemented, according to the present invention, using control and billing software particularly adapted for this purpose.

Figure 5:
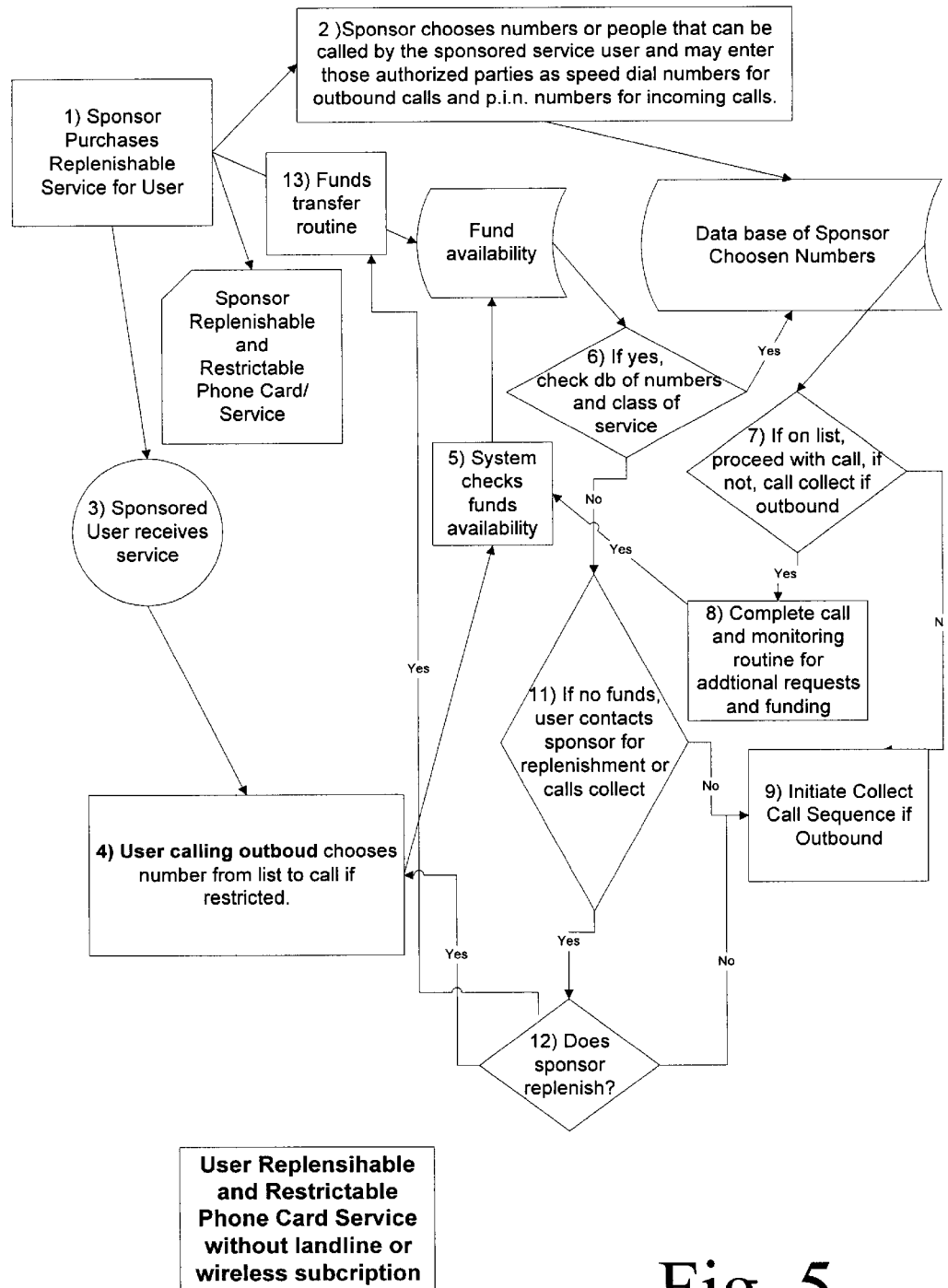
FIG. 5 is a flowchart of the calling process as applied to a phone card or virtual phone card process where sponsors can restrict and replenish accounts for their sponsered users.
Figure 6:
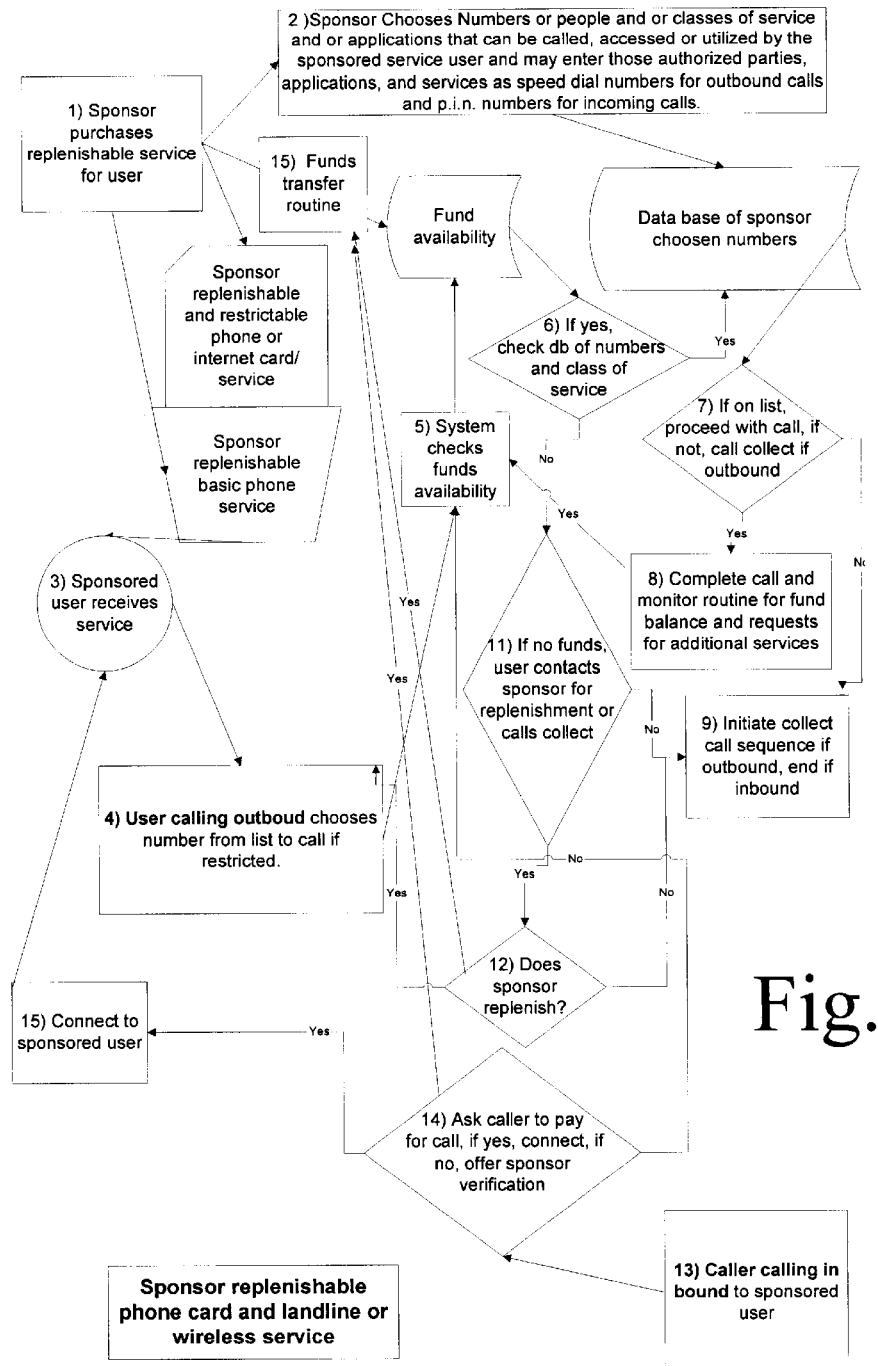
FIG. 6 is a flowchart of the calling process as applied to a combination phone card or virtual phone card with a local phone service subscription.

Additionally, examples of how the prepaid or real time paid phone bills are accessed to enable call completion is described in the FIGS. 5 and 6. The universal service user, sponsored or exempt caller, (as identified either by the communication device they are using or an account they use to pay for the call), calls outbound to another user who is identified by their phone number or data address as not willing or able to pay for the call, such as another universal service user, sponsored or exempt service user. Assuming that there are sufficient funds, the call can be completed while verifying, based upon an identifier, such as a phone number, internet address, or a person's name or other identifier, that the party being called is pre-approved by the sponsor funding the account by checking with the database of approved numbers, by blocking all numbers except those in the data base, or by blocking all numbers called except speed dial numbers representing those sponsored numbers placed in the account by the sponsor, or by connecting with the sponsor to see if the number not pre-approved can be added to the approved list so that the call can be completed. These numbers can be located in a switch, intelligent peripheral, server, smart card or similar means so that the totally free service can be paid by the sponsor ahead of time, or in real time, and can be replenished either automatically, or upon request.

This allows smart card, phone card or virtual phone card services to be paid for by sponsors in such a way that the numbers that are able to be called can be restricted by the sponsor, thus encouraging the sponsor to pay for the service. Also, this capability makes it more effective to restrict available services for business or security reasons. For Example, staff on travel can use the card to contact customers, suppliers and corporate support staff. The staff member's superior can "blacklist" or "white-list" the numbers that the employee may call. Blacklisting allows all identifiers but for those on the list to be contacted, while "white-listing" allows only those identifiers on the list to be contacted. The present invention utilizes both white-listing and blacklisting, and allows a sponsor to manage which parties may be contacted by the sponsored user during a telecommunication session. In addition to managing a sponsored user's contacts, the invention makes it possible for the sponsor to provide pre-approved applications such as purchases of information, services or products that would be part of the communication service, or the ability to allow the user to be contacted during the communication to request approval for those funds. This makes it possible for even very small units of purchases, which would otherwise be impractical, to be added to the bill paid by the sponsor. For example, the sponsor may wish to provide information services to the user that may only cost pennies per page or minute of information. It would be easy to add ten cents to the total sponsored communication bill or pre-payable and replenishable account or card, while it may be very impractical to make a separate bill or charge.

It should be noted the present invention is used to provision more than just voice services. Internet access, e-mail, pager and wireless services are a few examples of services that may also be provisioned. In general, any type of telecommunication, whether voice, data, multimedia or a combination thereof may be provisioned by the present invention In one embodiment, the invention also makes it possible for prison phone systems to be implemented so that prisoners can only call parties and numbers or communicate by via the Internet to those parties that prison officials approve of and that sponsors are willing to pay for. This provides service less susceptible to theft by other prisoners, a reason why many prison officials refuse to allow traditional phone card services Because the user of this invention's sponsored virtual phone card would limit the called parties to those intended by the sponsor, a prisoner would not be motivated to steal another prisoner's phone service.

Many currently in prison are only allowed to call collect to parties for security reasons. This makes it very expensive for called parties on fixed income to pay for those calls and accept charges. It would also be impossible for other exempt users to accept those charges and complete a collect call. But, a sponsor can be the third party that pays for that call either in real time or in advance using the type of arrangement as expressed in the present invention. Prison officials or the sponsor may restrict or white-list website contacts to educational or other approved purposes, while prohibiting access to other addresses or domains.

In addition, the sponsor may agree to pay for the accompanying application that uses the telecommunications medium. In such a case, the sponsor may white list or blacklist the applications available to the sponsored user(s). For example, the sponsor may choose to pay for a user's telecommunication bandwidth and service along with a medical facility's nursing or physician's information service. This allows the charge paid by the sponsor to cover small incremental service charges that would otherwise be inefficient, difficult, and costly to bill separately. The same is true of an educational package for students that may be priced by small units of information that the sponsor would be willing to provide for the user. These units may be as much as ten cents per page of material, which are otherwise impractical to charge as a separate items.

Additionally, when a very wide bandwidth call needs to be made, the sponsor needs to know the bandwidth and quality of service available and the time of day and duration for which the bandwidth and quality of service will be available from which sources and at what price. Therefore, in the event that there are choices by a provider or multiple providers, there is value in having an assessment routine which continually monitors and models the costs from all available and relevant network elements to provide the service. This includes monitoring and modeling the elements and prices of the local network elements in addition to the long haul network elements so that the sponsor can understand the most effective and least cost alternative for the specific service on a case by case basis when is the service is needed. This also makes it possible for different sponsors to pay for different services and/or applications. Without this capability, the universal service can be provided, but, at a less robust cost and service level opportunity. With this capacity, multiple networks and service providers can be used to offer the best possible service and/or applications for the user and sponsor while providing for additional competition in the telecommunications market place.

With the control and billing software configured according to the present invention, it is possible to roll out new phone service to users who normally cannot afford to establish phone service. This is true both in U.S. and emerging markets world-wide. This provides a significant advantage, making existing networks more viable, and making it possible to finance new networks at an accelerated rate. More users, whose bills will be paid by willing third parties, will make it possible for companies to meet return on investment targets earlier than would otherwise be possible.

Furthermore, network service providers will be able to connect more users sooner at a more cost effective rate. For example, when a service provider comes into a new neighborhood, the service provider can wire up an entire community instead of only the portion of the community that can meet credit standards. This is a problem not only for domestic cable television operators, and new competitive local exchange carriers but for both incumbent and alternative local exchange carriers overseas. Up until now, a new service provider brings infrastructure to anywhere between twenty and eighty percent of the local population, and then goes back on a case by case basis to add additional customers. Following the approach of the present invention, the new service provider can provide user connections to an entire community at once, at far less cost and more efficiently than sending in technician teams later, by offering non-credit service to those who do not meet a predetermined credit or debit standard.

This feature enabled by the present invention makes it possible for much desired competition to develop sooner. Users who normally can pay a subscription fee for one service provider may not switch to another, and certainly would not want to use two suppliers, may consider using a second supplier for certain services if the basic service is either free or paid by third parties. These third parties may either be callers, advertisers, applications providers, or other financially interested parties such as friends, family members, health insurers, banks, government agencies, etc. This will also foster competition and infrastructure investment since this will allow new Local Exchange Carriers (LECs) to offer services with confidence that the bills will be paid by someone with established credit or debit relationships. This is a substantial problem both for traditional CLECS and large users who may elect to become CLECs.

An example of the benefit of this approach to other financially interested third parties is its application to providers and payers of medical services. In the case of a poor elderly patient, the patient today may require hospital admission for special observation, at a cost of tens of thousands of dollars. Using the present invention's approach to telecommunications control and billing, it will be possible to save the medical services payer from substantial costs by making use of high bandwidth multi-media telecommunications universal service applications. This would even be true for those with no ability to pay for even a standard voice subscription, let alone high or very high bandwidth lines. In the case of the indigent elderly, both normal and high bandwidth media lines may be available to the resident, since everyone in the community can be wired for all new services as they become available in a neighborhood.

When it becomes apparent that the indigent elderly resident needs special medical observation, the provider and payer of medical services may find that it is more effective and less expensive to have home health care nurses provide service and hook up medical diagnostic and monitoring equipment through the high bandwidth communications lines between the patient and the hospital. As long as the payer finds that the monitored home health care costs are lower, the medical service provider/payer will be more than happy to pay for the additional communications costs, since they will save far more than they will spend.

The present invention has particular application to organizations which may become part of competitive local exchange carrier partnerships, including hospitals, universities, local governments, hotels, and other large users. The benefits to these organizations include billing protection from the bad debts usually associated with the launch of a new telecommunications product or market.

The third party payer software capabilities according to the present invention can also be tied into normal credit, new debit, and prepaid options. In this way, customers who start with either a credit standing, and fail to pay their bills, can automatically be switched to the "free universal service" plan, or one with a pre-paid service can be switched to the "free universal service" plan should their pre-paid funds run out.

The features of the present invention make it possible to service the poor without requiring them to meet income tests. In many cases, life line service is of no value to the poor because the poor often don't know about the life line program in the first place, don't know how to apply, find their applications slow to be approved, or find that they don't meet a particular requirement, though they still cannot afford the service.

The software according to the present invention will now be described in more detail with reference to FIG. 1. This software is implemented as part of a conventional call processing and control system in, for example, a central office switch.

Figure 1B:
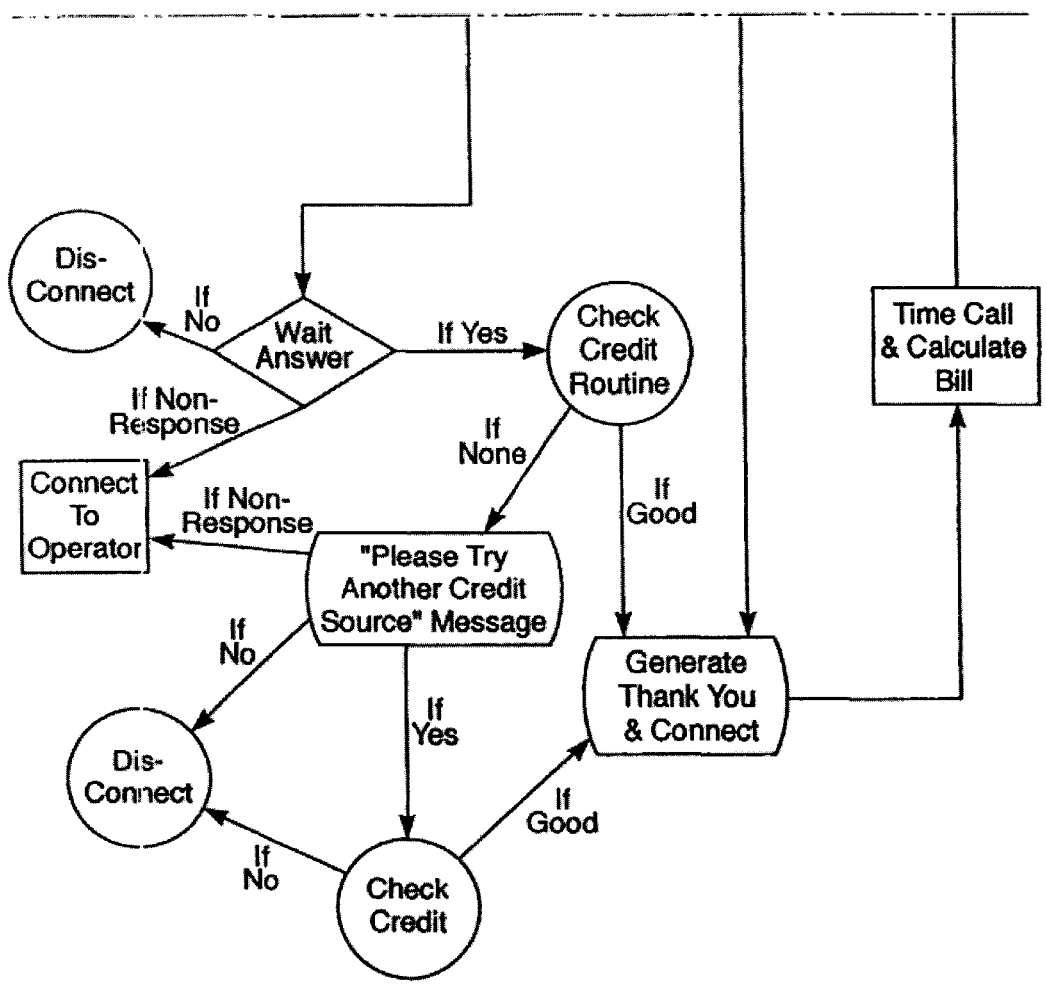

As shown in FIG. 1, when the calling party initiates a call to a universal service participant, the calling party's call is intercepted by the local exchange switch or the related intelligent peripheral to see if the called party is a Universal Service User ("USU") (with either non-subscriber or special subscriber status such as a pre-paid status). If a call is not connectable by a local switch, it will also be diverted to the Universal Service User Data Base so that the unserviceable number can be added to the USU set-up routine so that the caller may be able to complete the call. When the called party is determined to be a Universal Service User, the account will be examined to see whether or not it is a pre-paid account. If it is a pre-paid, the balance is checked to see if there are enough funds in the account to cover the call. If there are sufficient funds in the account, then the call is completed, unless it must first go through an authorization routine described below.

If there are not enough funds in the account, or, if a pre-paid account is not established, then the calling party will, before the call is completed, hear a voice on the line (or see a message or receive an indication one way or another) that informs the caller that they are reaching a number which requires an additional payment of x cents per minute to complete the call or service in the case of a multimedia call or other service. By pressing the "#" key, or by saying "yes," they may indicate their willingness to pay the additional charge. Once the party has agreed to the charge, (and the ability to pay is confirmed) then the call is completed and billed to the paying party or parties.

In this way, the called party with free phone service receives the call, and the service provider paying for the free service can recoup its investment in providing this access. The software both interrupts the caller, queries the caller, determines whether to complete the call by seeing if the caller is willing and in many cases able to pay for the call, completes the call, and then bills the call.

The software may also provide for any call forwarding or earmarking of users who are identified as universal service clients, and any other requirements that may be established in the negotiations that are required between incumbent local exchange carriers (ILECs) and competitive local exchange carriers (CLECs).

The present invention also provides processing for incoming calls to pre-paid accounts, and a setup to transfer to Universal Service User (USU), sponsored or exempt user Status. The Universal Service User may also be provided with monthly subscription services and/or measured services prepaid by the Universal Service User, or by third parties. When calls come into such an account, the prepaid account may be checked for an account balance to see if the call or service can be completed and paid by the funds left in the pre-paid account. If the account is sufficient, the call or service is completed and monitored for account balance in real time, but if the account is depleted, low or becomes low during the call, then the message to the caller is generated, requesting that the caller agree to pay to complete the call or service. (This allows for prepaid accounts with or without prepaid cards that are payable by third parties, not just the user, and allows the prepaid user to continue using telephony service once the prepaid account is depleted.)

This will also allow either the exempt caller or the exempt called party to be connected with the sponsor either before, during or after the call to request additional funds. For example, when funds are low, the exempt caller could be routed to the sponsor so that the sponsor can approve additional funds by any means available to the sponsor or by a collect call with an additional charge that can be placed on the sponsor's phone bill or prepaid account that is accomplished when the sponsor agrees to accept the collect call with the additional charge. The caller could be routed to the sponsor automatically when low of funds, or as an option since the caller might still choose to call outbound collect. When the call that has funds initially is running out of funds or when the call is interrupted to advise of low funds, the caller or the called party can be connected to the sponsor in the same way.

During the communication, the user may also need to purchase information or applications that the sponsor would be willing to purchase on behalf of the user. The present invention makes it possible to economically provide incremental services to the user as part of or in addition to the bill that the sponsor would agree to pay.

The software routine makes it possible for the sponsored user to request an additional party to be added to the conversation or for an additional service to be requested as part of the communication.

One example of how the service is offered is be where the exempt caller is restricted to calls that the sponsor sets up including or exclusively as speed dial numbers. The software has a speed dial number associated with the sponsor, such as 99. So, when the exempt caller's account runs out of funds and time, the exempt caller dials 99 and is connected with the sponsor so that the sponsor can place more funds in the account. This is done automatically, as in the case when the acceptance of the collect call includes an additional charge to the sponsor's phone bill, or manually when the sponsor needs to take some other action to provide funds to the account, such as making a credit card transaction or other type of deposit, or approve the funding of a specific application or the addition of a new destination connection or application. If the sponsor can't be reached, the user can dial another number such as 98 and be connected to a collect call routine. If the user needs another party to be connected to the call, the user can dial another preselected number to add the additional party. If the user needs to purchase a service as part of the communication, the user can select another preselected number that would transfer funds to provide that service.

FIG. 5 illustrates how the present invention would be implemented in an account not necessarily tied to a given landline location.

In step 1, the sponsor purchases a communications service that is replenishable on behalf of the exempt user who does not pay for the service. Funds are transferred to the account of the user through the fund transfer routine (step 13).

In step 2, the software allows the sponsor to add in phone numbers and their speed dial equivalents (or voice recognizable equivalents) for the parties the sponsor would like to see the user contact.

In step 3, the user receives the activated service.

In step 4, the user of his agent attempts to make a call to a supported number.

In step 5, the software checks to see if there are sufficient funds to make a call.

In step 6, if there are sufficient funds, the software compares the number and class of service, if appropriate, (where a number or speed dial number has an accompanying bandwidth or quality of service capability as set by the sponsor) chosen with those in the database.

In step 7, if the number is in the database, then, the call is initiated and completed and monitored in the complete call and monitor routine in Step 8. The complete call and monitor routine monitors the account fund balance periodically by checking back to step 5 and requests additional funds when the funds run low and also monitors the communications for a signal from one of the users requesting an additional service during the communication, such as a connection to an additional party or to an application requiring additional funding. (The complete call routine also may signal a request for a higher bandwidth of service to the service provider which may then provide it under a different rate structure.) If the number or requested service is not in the database then the process goes to step 9.

In step 9, The software diverts the call to a collect call procedure.

If there were insufficient funds at step 6, then, in step 11, a funds replenishment routine begins, which creates a collect call to the sponsor so that the sponsor can add funds or a collect call to the sponsor with an additional charge. In step 12, when the sponsor accepts the call, the sponsor agrees to pay for the basic collect call and an additional charge which will enable more funds to be placed on the account of the sponsored user through the funds transfer routine of step 13. The additional charge will appear charged on the phone bill of the sponsor as part of the collect call charge. When the sponsor agrees to replenish the account, then the call can be reinitiated as in step 4 or completed if the call had been in suspense mode while the sponsor was contacted.

In step 12, if the sponsor can not be reached or if the sponsor declines to refurbish the account at that time, the user will be routed to the collect call routine.

FIG. 6 shows a similar routine in connection with a sponsored landline or wireless subscription.

In step 13, incoming calls are received and the incoming caller is asked to pay.

In step 14, if the caller agrees, funds are transferred in the funds transfer routine (step 15) and then the call is connected, if the caller does not agree, then the software then goes back to step 5 to see if funds are available from the sponsor, if they are, then the software goes to Step 6.

In step 6, the software checks to see if the calling number is on the list of approved callers for which the sponsor will pay. If the calling party is on the sponsored list, then the call is completed; if not, then the call is ended or the sponsor is called to see if the caller can be placed on the list of approved callers.

Figure 7:
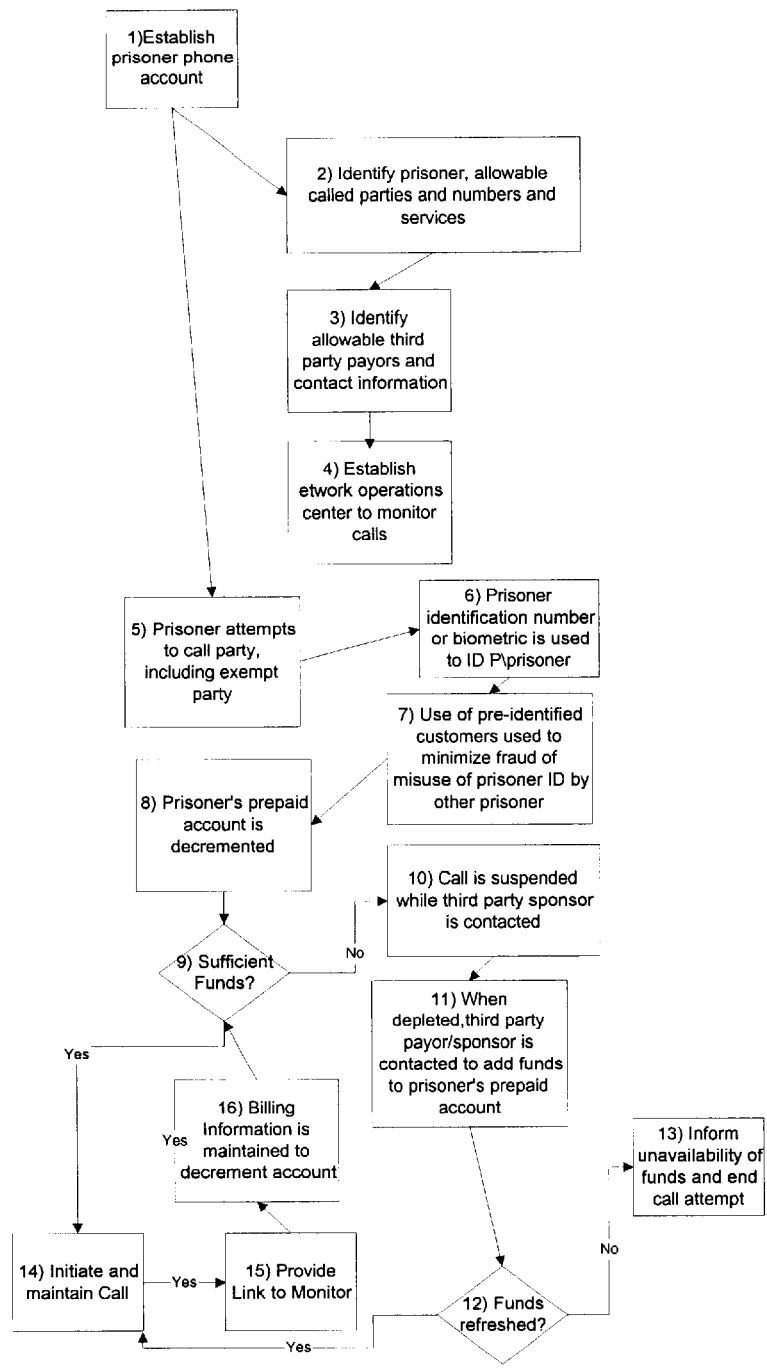
FIG. 7 is a flowchart of the virtual phone card process as it may be applied to monitored services such as a prison phone service.

Similarly, for service to prisoners FIG. 7 illustrates the steps necessary to provide sponsored phone service for prisoners:

In step 1, the prisoner phone service funded by a sponsor is established and recorded into the software.

In step 2, the database or directory of the software is established which includes the identification of the prisoner, the allowed called parties, their identification and phone numbers, and classes of allowed service.

In step 3, the identification and number of the sponsor(s) is established.

In step 4, the connection with the monitoring routine, if required, is set up.

In step 5, the prisoner initiates a call sequence.

In step 6, the prisoner is identified by the software with a PIN number, biometric or other identifier.

In step 7, the called number is checked by the database to ensure that the number has been approved for payment by the sponsor and, as required, allowed by the prison to be called.

In step 8, the prisoner's fund is checked for sufficiency and decremented if sufficient funds exist. If step 9 indicates that sufficient funds exist, the call is set up in step 14, monitored in step 15, and bill completion is performed in step 16. If step 9 shows insufficient funds, then in step 10, the software initiates a call or real time data communication to the sponsor and requests additional funds. This may be in the form of a collect call with an additional charge to the sponsor's phone bill, credit card or prepaid account. If the sponsor agrees to add more funds in step 11, then, once the funds are refreshed in step 12, the call is completed as in step 14. If no funds are available in step 11, then the call is suspended. At that point a new call or collect call may be attempted.

As this embodiment shows, and as is global to all embodiments where a determination of the identity and the corresponding services, bandwidth and applications is necessary, an identifier may consist of a variety of items. For example, a phone number, an IP address, Internet address, full or partial DNS name, a domain suffix, or a hardware address may be used as an identifier. There are a variety of means available to uniquely identify a user of a telecommunications system, such as that disclosed herein. Similarly, the corresponding service or project may be referred to by an object identifier whose nomenclature may be privately or publicly developed and or published.

Figure 8:
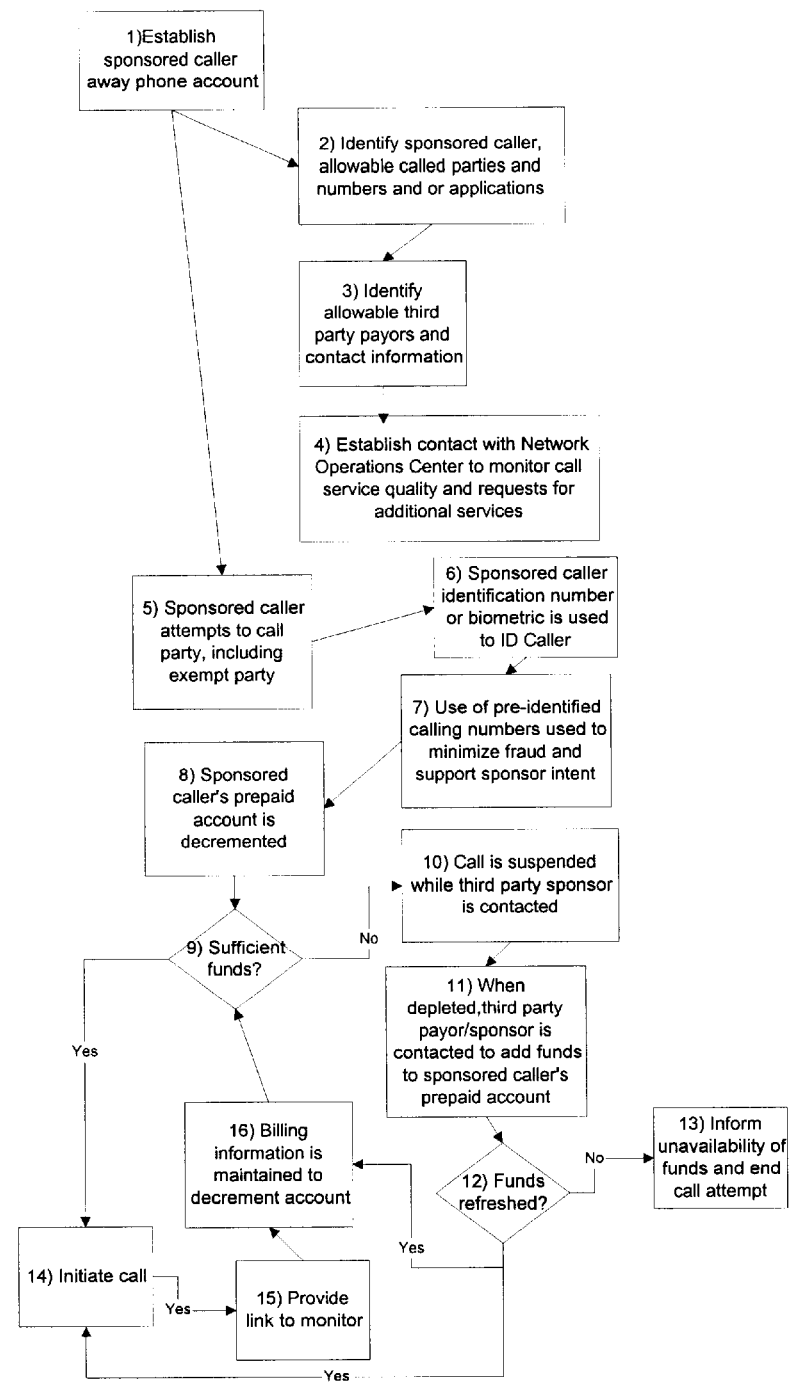
FIG. 8 is a flowchart of the virtual phone card process as it may be applied to non monitored services such as a college or business campus or users while traveling.

FIG. 8 illustrates use of this system for sponsored calls in a business or school campus or for a user traveling away from home in a similar manner, but where the call monitoring sequence only monitors call fund balance and requests for additional services.

Figure 9:
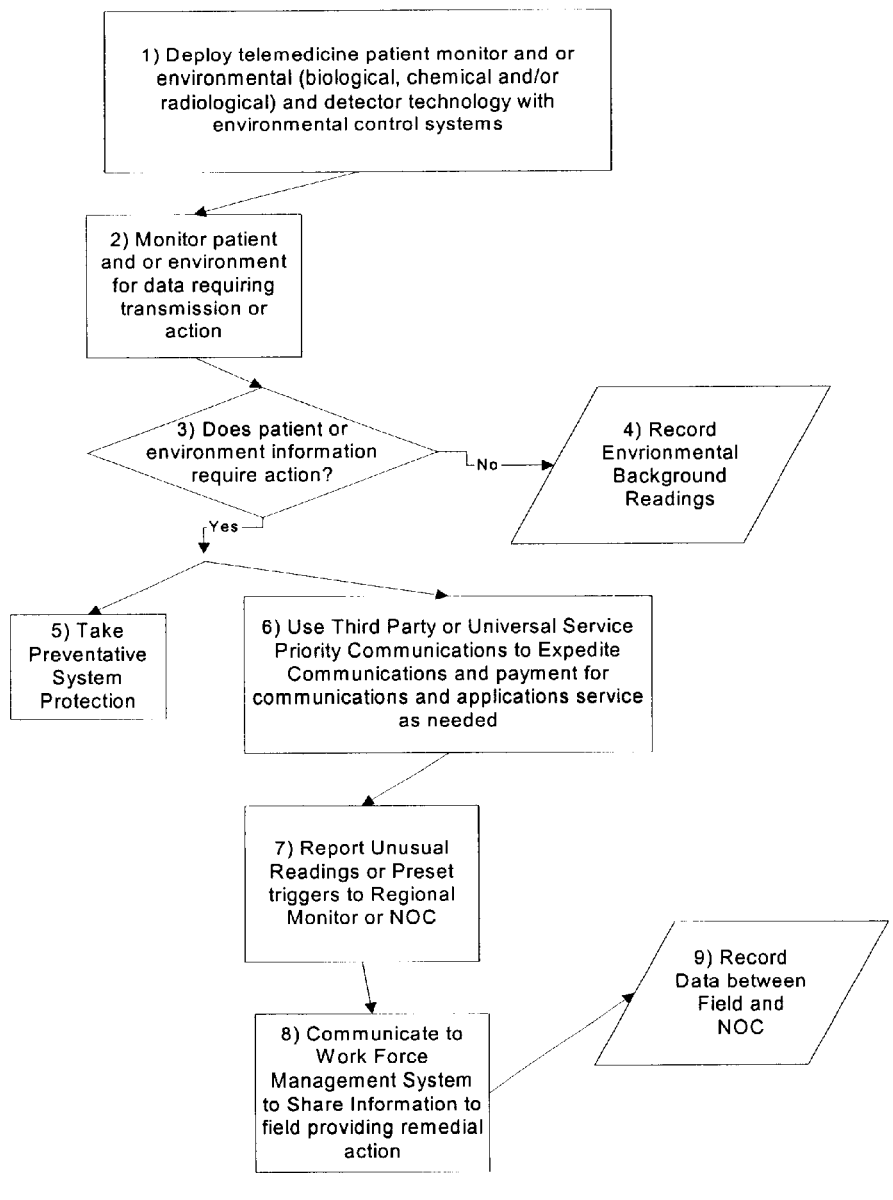
FIG. 9 is flowchart of the process of monitoring a person or their environment so that triggering events can initiate sponsored communications.

A similar application is shown for an automated patient and or environmental monitoring system in FIG. 9. This embodiment allows for monitoring systems to send information and requests for information, not unlike electronic data interchange requests in response to personal and environmental needs. This is accomplished through the use of secured communications agents, that interact with each other and communicate with one another to share, collect and transmit information to an information gathering system.

When a patient and or environment is monitored so that readings of events require communication or action, the sponsored communication system can be initiated. The invention enables calls made on behalf of the sponsored patient or client so that the sponsered medical and or environmental services can be provided and additional medical or advisory services can be provided and paid for by sponsors. Similarly, environments can be monitored for the presence of biological or chemical toxins. When detected, actions can be taken to shut down air handling systems, take remedial action, and call appropriate authorities.

As in the virtual phone card applications of this invention, the person making the call or the person such as a patient being monitored, can be identified by any of the methods for providing automatic location identification systems that are part of fixed or mobile users. This provides either an additional security feature for applications that require additional security, or, identification for patients who may not be able to identify themselves or for patients whose health or environmental monitors meet a circumstance which requires an emergency communication supported by the sponsor.

Step 6 of FIG. 9 shows when the sponsored communication routine is employed for pre-approved communication.

The present invention also provides a mechanism for processing incoming calls to pre-paid accounts for restricted or authorized users. The value of this type of third party paid account is that the payer of the account can restrict the availability of those calls to callers that are authorized to make certain types of calls which can be verified either by a personal identification number (PIN) or digital signature. In this way, calls can be paid for by a medical plan that will cover authorized calls to the user by authorized medical personnel attempting to deliver services to the Universal Service User. The same type of service may be available to government agencies attempting to contact or deliver services to the Universal Service User. The service may be paid by one agency but usable by other authorized agencies. Similarly, teachers in school systems may be authorized to call their students or the students'parents. Again, security codes such as PIN numbers, digital signatures, smart cards, interactive video, or other security systems including but not limited to pseudo-random number generators, finger print, bio-feedback, infrared scans of capillary heat generation, retina scans, etc. can be used as means to verify authorized users.

The present invention also provides an improved processing method for automated conference calling for medical, research, public safety and security applications. Users can be identified for operation of an automatic conference call application such as a research or medical application needing connection to multiple health care providers (or their data networks as in the case of electronic data interchange), or, by authorized law enforcement agencies with warrants for legal wiretaps so that when a call is placed to such a user, instead of having the call suspended and given the voice message that an additional charge is required, it can be tied in as a conference call to a law enforcement recording device that would enable the collection of telephonic evidence. This feature may be required in certain environments such as prisons where prisoner phone calls may be required to be monitored. This would allow for legal tapping of the call without substantial effort by the carrier or investment by the government. Using this method will also make it possible to use virtual phone card types of arrangements within a prison so that the security and prepaid features are tied to specific accounts and approved calling parties without having to link the call from a specific telephone or computer. This feature of the software and process also makes it possible for the host switch to initiate a conference call from a user of this type of sponsor paid phone service, phone card, or virtual phone card to approved additional parties, or to contact the sponsor so that additional parties can be added to the approved list.

The invention also makes it possible to request additional funding from any of the parties, including the third party providing free communication services, so that the additional party or application can be added.

Figure 2A:
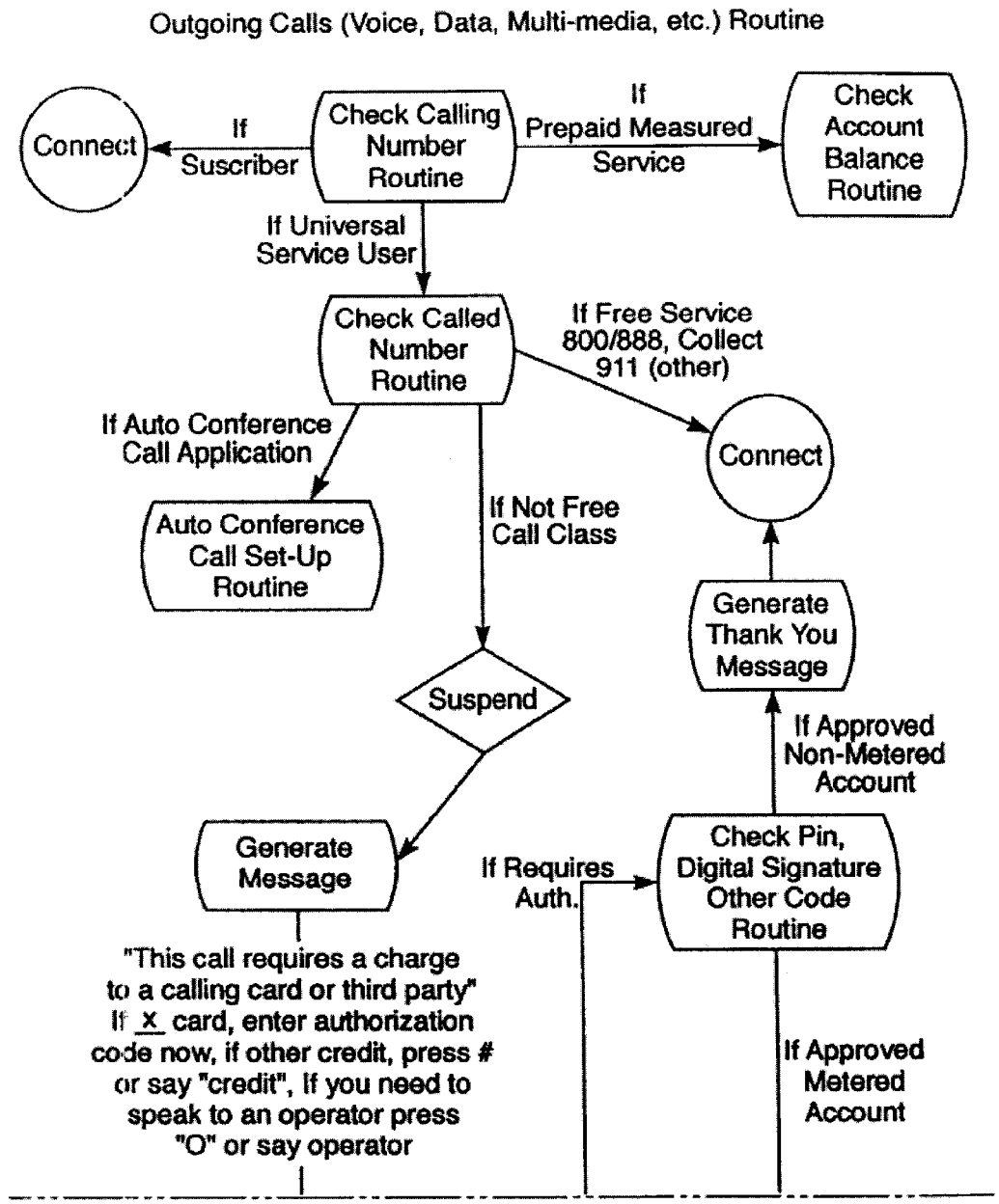
FIG. 2 is a flowchart showing an outbound calling process according to the present invention.
Figure 2B:
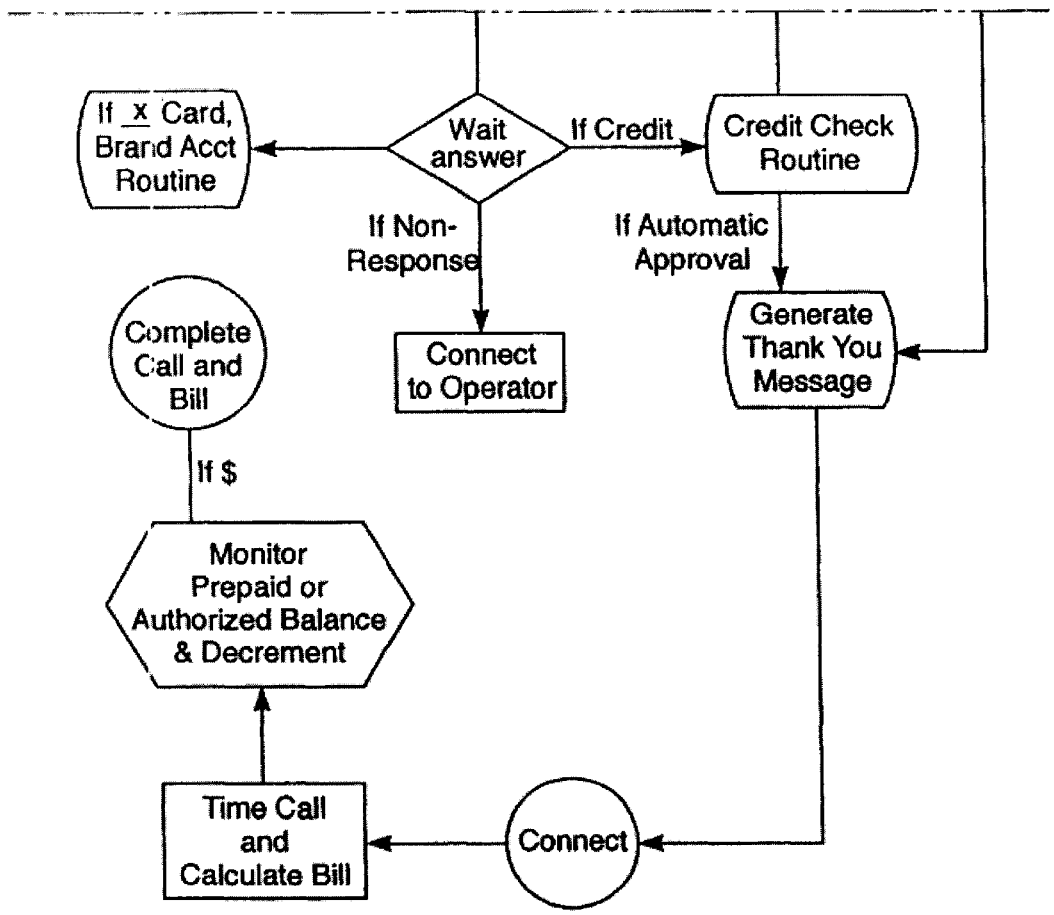

The present invention also provides a novel software application and mechanism for controlling and billing outgoing calls from Universal Service Users. A preferred embodiment of this mechanism will be described with reference to FIG. 2, which is a flowchart showing an outbound calling process according to the invention. When the universal service participant makes calls, they are restricted to collect calls (including local), or other third party payer arrangements such as toll free or 911 calls. However, they may also elect to arrange for pre-paid services which may provide certain services until those funds are used, at which time, the Universal Service User reverts to the non-credit/debit call restrictions. These pre-paid services may either be subscription-based or measured services. This makes it possible for a Universal Service User to call another Universal Service User, both who have service paid entirely by sponsors, or to parties unwilling to pay for a collect call.

This is especially valuable when users in very poor countries are provided phone and or Internet services by their relatives, friends, or sponsors in more developed countries. This then provides a source of services and funding for the users and financial support for the growing network in an emerging economy.

The measured services, such as long distance, may be limited to pre-paid limits or to specific numbers or by specific uses and or users determined by PIN codes, digital signature, or other security measure described above. This will account for multiple users at a location or household with different authorization levels which will eliminate unauthorized use of credit, which is one of the reasons why many users have bills they cannot subsequently pay.

This will also make it possible for users to be authorized on the condition that they call pre-identified numbers from any location or phone account that can be billed to third parties with financial or other incentives to sponsor the call. For example, a pizza delivery service or a personal injury lawyer may establish an agreement with the service provider to pay for any incoming calls to their office initiated by Universal Service Users, in the expectation that such calls will provide business opportunities.

Figure 10:
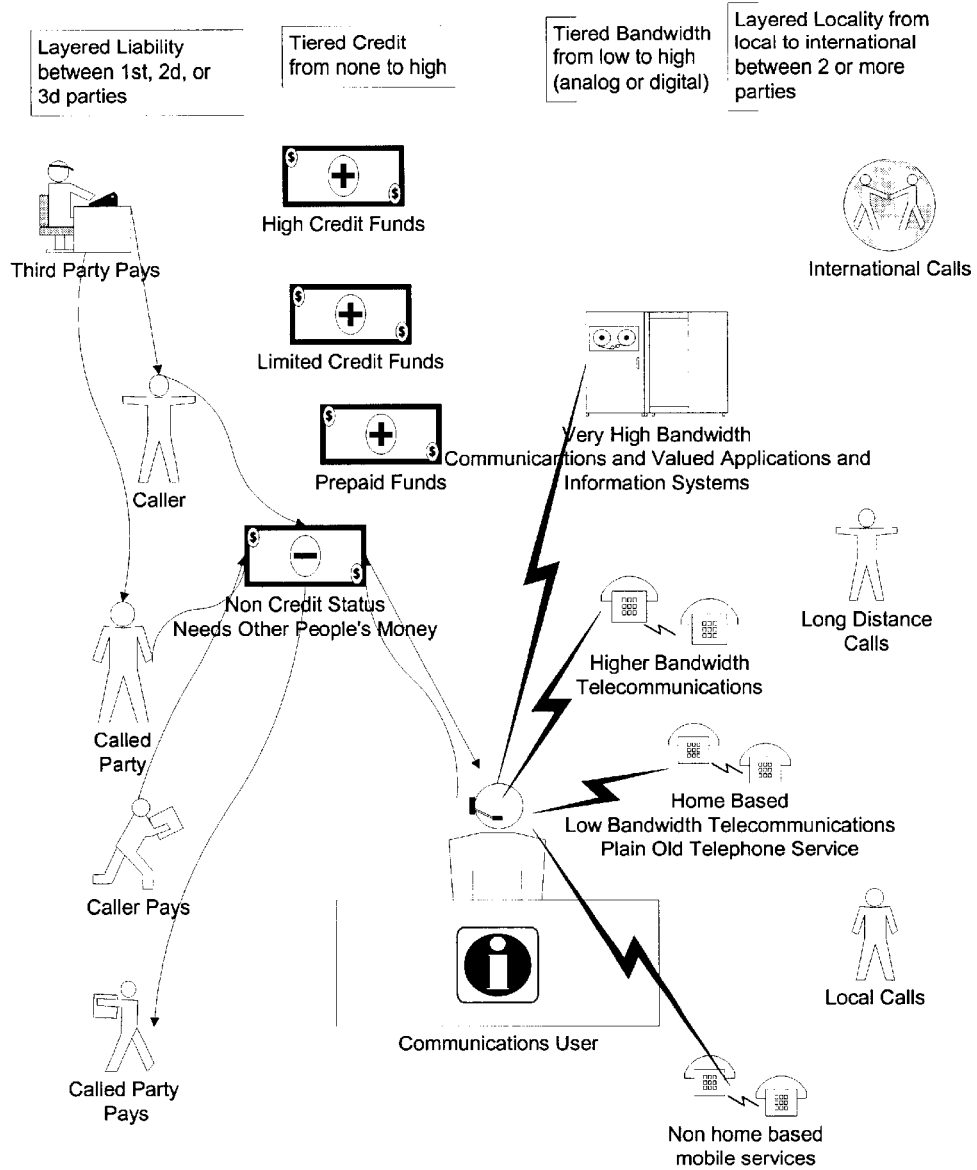
FIG. 10 is an illustration of the layers or levels of universal service that can be provided by the invention.

The invention supports an approach to universal service that makes it possible to implement communications systems with a variety of levels or layers of liability (depending on the party that pays) of credit, (none to some to high), of bandwidth (low, POTS, to high), and locality (local to long distance, two or more parties) as shown in FIG. 10. The invention makes it possible for a service provider to avoid the high cost of turning a user's service on and off when the user is not able to pay their bills in a timely manner. Now a combination of sponsor paid and prepaid services can allow the user to stay connected while their credit status changes. The invention also makes it possible for sponsors to provide application services as part of the communication.

This invention also makes it possible for a business to provide users an additional phone service or line as a benefit of being a customer. The customer might pay for one phone line but have a second phone, data, or multimedia line paid by the sponsor. Or the customer might have measured service that the customer pays for in some circumstances, but where other measured services are paid for by the sponsor.

The software which intercepts the call is preferably either in the switch or in an intelligent peripheral of the local service provider, even if the local service provider is a Competitive Local Exchange Carrier and User Facility. This software may also be located elsewhere in the network, such as a tandem switch, the user premise equipment, or in some combination of the network elements. What is important is that the Universal Service User be provided with access to a communications network, such access in some cases being is usable only when a sponsor or third party wishing to call or to receive calls from the USU has agreed to pay a fairly substantial metered or fixed rate for placement of the call.

Figure 3:
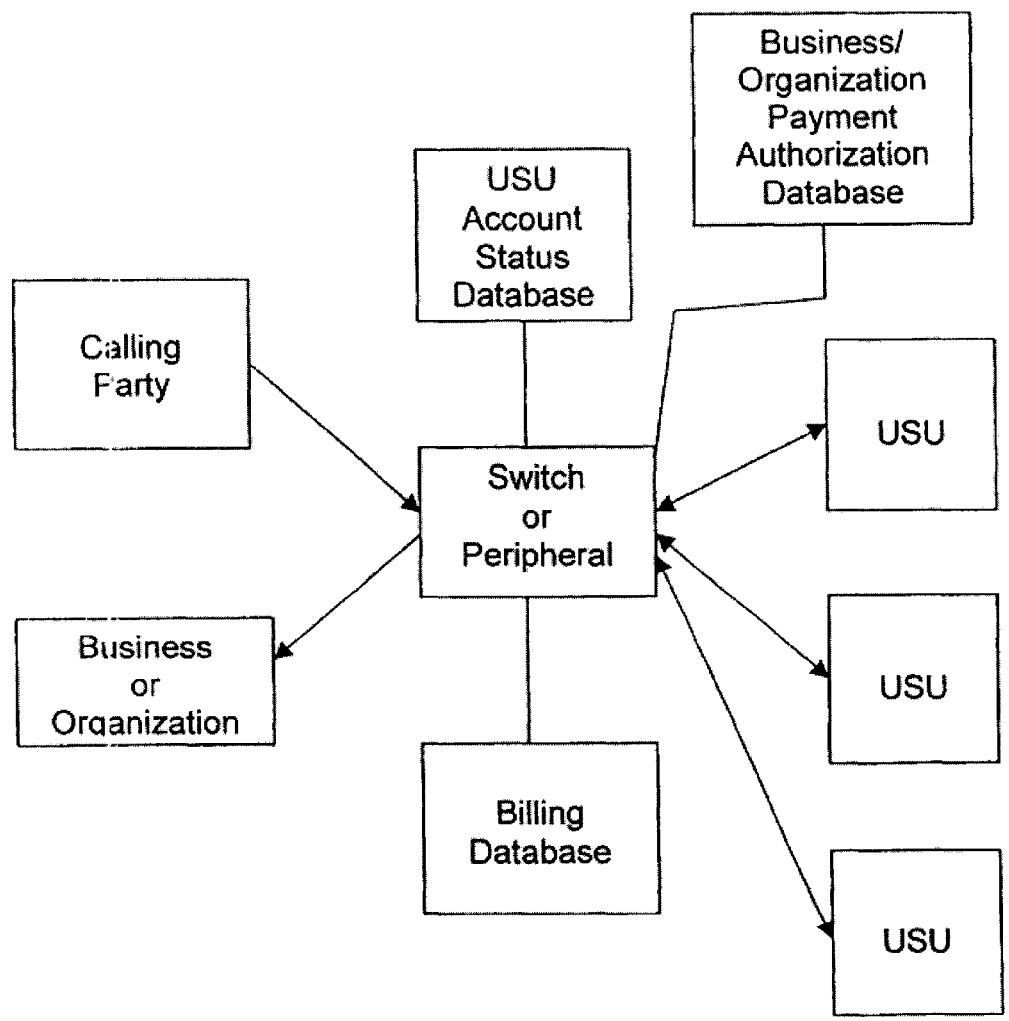
FIG. 3 is an illustration of a simplified block diagram of the preferred embodiment of the switching system according to the present invention.
Figure 4:
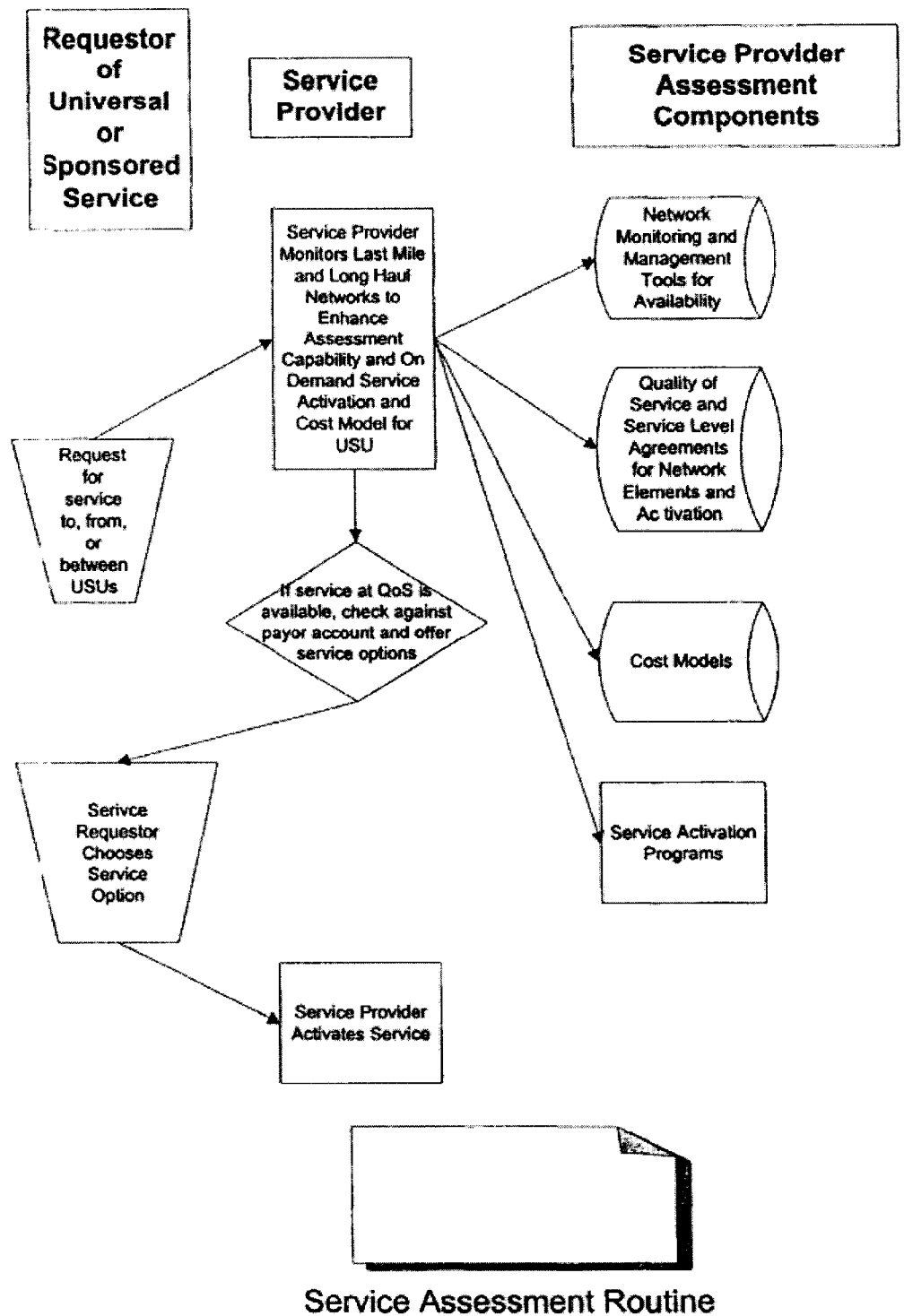
FIG. 4 is an illustration of a simplified block diagram of the preferred embodiment of the sponsored or universal service virtual real time wide band assessment routine.

FIG. 3 is a simplified block diagram of a preferred embodiment of the switching system according to the present invention, which implements the processes described herein. The switch is connected to USUs and other users, and to various calling parties wishing to place calls to USUs. The switch is also connected to various parties who may have arranged, or be willing to arrange, to pay the expenses involved in receiving calls from USUs. The switch has associated with it a billing database for storing billing information and generating bills and credit reports, a USU account status database for determining the prepaid status of a USU account, if any, and a payment authorization database for recording authorizations by businesses and other organizations. These authorizations may include either generally authorizing payment for USU-originated calls to a certain number, authorization for certain outgoing calls to the organization or other predetermined numbers, authorization for certain payment codes to be effective to place a call to a USU, and other authorizations described above.

FIG. 5 is a similar process description showing how this is implemented as a phone card or virtual phone card system.

FIG. 6 is a similar process description showing how this is implemented as a phone card or virtual phone card system with a sponsored local service.

FIG. 7 is the process where the invention provides service in a controlled environment such as a prison.

FIG. 8 is the process where the invention provides service in a campus environment such as an educational institution or business.

FIG. 9 is the process where the invention provides monitoring and communication services for either an individual such as a patient or an environment FIG. 10 shows the combination of layered services between multiple levels of liability, credit, bandwidth, and locality.

Figure 11:
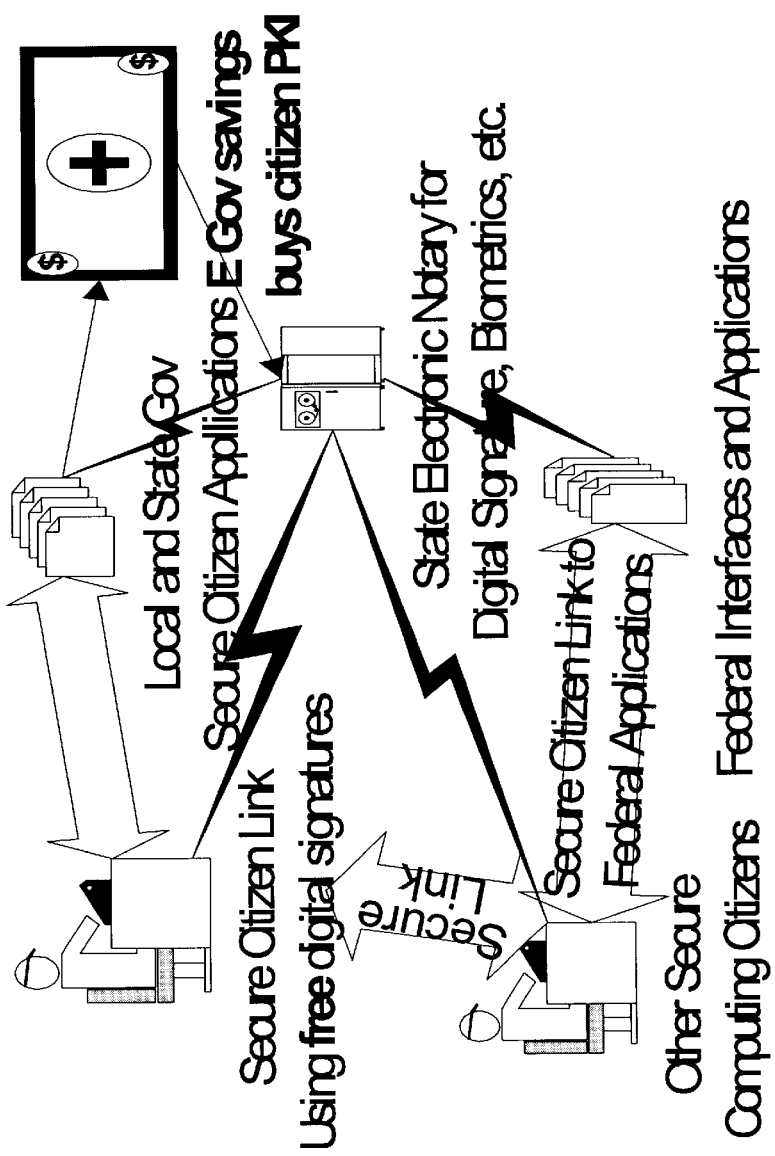
FIG. 11 is an illustration of free security services that can be provided by such as local governments and financial institutions so that public and private networks can be protected from malicious acts.

FIG. 11 shows the example of a security application provided by sponsors such as local governments to their citizens free of charge.

The present invention may be applied in a business plan application according to the following discussion. This business plan proposes the creation of C-LECs with major users such as hospitals, universities, and local government agencies (HUGs) as co-owners. This enables users to turn cost centers into revenue centers with the possibility of entirely offsetting their current costs while out-sourcing the management and/or financing to the joint venture. This could ensure that local communities receive the latest and most effective technologies and infrastructure since the HUG could acquire and deploy the technology or infrastructure before the local service providers who may take longer to determine whether they should provide that service on their own. For infrastructure based C-LECs, this approach attracts joint venture participation with large users that will quicken market entry, profitability, and rights of way acquisition. Creative third party billing techniques will protect the C-LECs or their HUG partners from bad debts and make it possible for ILECs to use CLECs to help collect their own bad debt. Prospective industry partners are leaders in C-LEC management.

Regulatory restrictions on local phone service changed significantly in 1996 when Congress enacted The Telecommunications Act of 1996. The Act opened the way for the incumbent local exchange carriers (ILECs) to get into the long distance business if they allowed competition in their local phone markets.

Before they enter the long distance market, The Telecommunications Act of 1996 requires the incumbent local exchange carriers (I-LECs) to satisfy fourteen conditions designed to help competitive local exchange carriers, or C-LECs, enter the local phone market. Given the large potential profits from long distance services, the I-LECs (from their point of view) are cooperating aggressively, making every effort to meet the law's fourteen conditions as soon as possible. On the other hand, many CLEC entrants have fallen behind in their goals to provide services, especially broadband services to smaller communities and residential areas. This has spawned wide spread interest among many HUGs to find other ways to attract new infrastructure. HUGs may wish to entice alternative providers by providing incentives, such as paying for the local infrastructure.

If efforts such as the Telecom Act of 1996 are successful, the public in many areas of the country will have more than one local telephone company competing for their business. Cable television companies, electric utilities, competitive access providers, wireless service licensees, long distance providers, and various combinations of the above will all be potential entrants into the local phone service markets.

The present invention makes possible a strategy for avoiding most of the problems that threaten cash flow of telecommunication firms entering new markets, namely, that of bad debt collection. To complicate this problem further, industry reports suggest that incumbent LECs will try to dump non-paying customers on their newly emerging competitors. This fear could keep a number of prospective competitors from joining the market. (See Telecom February 1997, p.52)

The system of the present invention eliminates the non-payment problem. The software program classifies all of the customers on a fair but very conservative credit arrangement that can only be preempted by a pre-paid, or third party paid arrangement. This makes it possible to serve customers who cannot establish or fail to maintain credit.

This highly conservative credit policy protects the investments made in the C-LECs, provides for higher profit margin services, and, at the same time, provides a unique spin-off social benefit to the communities served by the C-LEC as described below. With the present invention, a universal service friendly service agreement allows users to have prepaid or third party paid phone service even when they have no credit. When individual customers are added to the phone company customer base, they can be added on a prepaid or third party paid basis. The software according to the present invention will decrement these local phone service accounts on a real-time basis and be able to switch to a third-party payer basis as the account runs out of funds.

Once the customer's pre-paid account is out of funds, only collect calls, toll free calls, sponsored calls, and exempt calls (including 911 calls) can be originated. Incoming calls will then be intercepted and callers will be asked for an additional charge if the caller wishes to complete the call. This will allow uninterrupted service to the user even though the pre-paid funds (if any) run out. This market driven solution to the universal service problem of service to those without funds to pay for service requires no tax or consumer subsidy. Each caller decides whether or not it is worthwhile to pay the extra charge for a specific call. If it is worthwhile, the customer pays. If not, the caller may decline and the call is not placed. In many cases, HUGs themselves will be able to maintain contact with clients that otherwise could not be cost effectively reached. Self-sponsored or prepaid call programs can also use this program to minimize unwanted calls while maintaining a listed phone number.

In this case, a user would maintain a listed phone number that calling parties could access and use but only by paying an additional charge. This way, a telemarketing caller would be able to make the sales call during the dinner hour but only if they pay the extra charge that goes to the account of the user. However, certain callers or sponsors could be given a pin number or other secure device to complete the call without paying the charge. The system could be used to determine which callers are sponsored by a third party so that the third party can be billed by the calling party so that neither the calling party or the called party would pay for the call.

This universal service solution would eliminate the potential problem of having poorly paying clients dumped on a new service company by the incumbent LEC. All non-paying customers could be welcomed on the pre-paid and third party payer basis without loss to the new service provider. This approach requires no income testing. Even the wealthy are welcomed to this service. This differentiator can provide substantial public policy, regulatory, political, and public relations benefits while protecting investor assets. It should also be priced to bring far higher margins than traditional telephony services. See FIG. 10 for layered services illustrations.

The present invention can thus be used in a partnership arrangement between a new alternative local phone service provider and partners among hospitals, universities, and local governmental agencies (HUGs) in the transformation of their telecommunications cost centers into revenue centers. The goal of this partnership is to off-set 100% of all current costs to the partner with savings and revenue. By joining experienced partners as co-owners of an alternative local phone company, this off-set is possible without having to manage a new line of business. In effect, the operational management is contracted out to the partners.

In this application of the present invention, these resources are organized so that the hospitals, universities, and government agencies (HUGs) can become C-LECs themselves or partners of CLECs rather than continuing to use the 1-LEC or purchasing a variety of services from a series of individual providers. Furthermore, this is done at a lower price for improved and more varied services than was offered by the 1-LECs.

By applying for C-LEC status, or becoming a partner of a CLEC or other communications provider, customer premises-based providers, such as hospitals, colleges and universities, and local governments can turn their existing internal telecommunications networks and infrastructure into the core of their own, captive C-LEC, and realize the cost savings and operational control that this transformation brings. By expanding the C-LEC through the addition of user/customers, with whom the core provider may already be doing business, or to the local community at large, the C-LEC will be able to resell services, purchased at deep discounts, to the C-LECs customers and share in the revenue from the transactions.

When the C-LEC is expanded beyond the original customer premises base, the risk of taking on "bad debt" can be effectively eliminated through the use of pre-pay and third-party-pay applications according to the present invention, which are software-based.

This means that the C-LEC will avoid having to try to collect from customers who are unable or unwilling to pay their bills.

Processing of incoming calls to a pre-paid subscriber is accomplished in the following manner:

Step 1. Check Pre-pay Account of Called Party, as Call is Processed
   IF $, Then Connect (Give Warning if Close)
   IF $0, Then Do Step 2
Step 2. Give Message to Caller "This Call Requires an Additional $X/Min."
   "Please Press # to Accept this Charge on Your Phone Bill or Press * to Place it on a Credit Card".
Step 3. If Caller Agrees, Connect and Bill.

The Steps to Cost Reduction, Revenue, and Network Quality:

The preferred C-LEC development process using the present invention is divided into six steps:

Step One—Feasibility study—defines the technical, business, regulatory, and financial requirements, the opportunity, the partnership/team, and the time line.

Step 2—Develop Pre-C-LEC operations and submit C-LEC application. Prior to receiving authorization to function as a C-LEC, it is possible to initiate tele-management services. Tele-management activity positions the nascent C-LEC in the IS role of telephone service manager, functionally between the I-LEC and the end user. The tele-manager receives a discount on services from the I-LEC (CLEC partner) in return for management services. This provides early cost reductions. Pre C-LEC status tele-management discounts are available from the I-LECs as well as from alternate C-LECs. Business, technical, and legal advisors develop the application, review it with HUG participants, submit it and the tariff agreement to the Public Service Commission and negotiate the resale agreement with the 1-LEC.

Step 3—Commence C-LEC operations. C-LEC status makes it possible to receive the deepest wholesale discounts from the incumbent local exchange carrier thereby reducing the costs of local telephony services for the C-LEC partners to their minimum level and receive revenue for the completion of long distance calls.

Step 4—Resell C-LEC services. The C-LEC can begin to collect revenues by reselling telephony services to its business affiliates. Discounted services to business affiliates can strengthen service ties to customers while bringing in revenue that can far exceed pre C-LEC operational costs.

Step 5—Deploy advanced applications. The use of the network can be expanded through the institution of advanced applications that create value for the C-LEC user community in areas such as energy and image management, LAN/WAN management, wireless communications, fax, Internet, e-mail and added voice services. The mix of advanced applications to be offered with the timing of their introduction for sale by the C-LEC is decided based upon the needs of the premises provider, the customer base and other factors. Initial applications such as energy management can be explored during the initial feasibility study phase.

Step 6—Unbundle and competitively source network elements. Specific elements of network services can be out-sourced to suppliers other than the I-LEC in order to enhance service characteristics and further reduce costs. These service elements will be available either from infrastructure-based C-LECs formed by utilities, cable companies, competitive access providers, long distance providers, and wireless licensees, or from specific service providers that will be created to serve C-LECs.

Provisioning of Unanticipated Bandwidth and Service Requirements

In an alternative embodiment, the system and method of the invention allows for the universal service user to activate unanticipated bandwidth and services on an incident-by-incident basis (See FIG. 6 steps 2, and 8.). When the sponsor agrees to pay for sponsored service on behalf of a user, the sponsor may be asked to also set up the classes of service that could be needed by the user. The sponsor may allow standard voice services for certain called or calling parties, but very wideband services for medical applications but not, perhaps, in entertainment applications. This allows the sponsor to provide the services for the user that the sponsor is motivated to provide.

As shown in FIG. 6, step 2, the sponsor chooses the parties that can communicate and the classes of service available to the sponsored user. For example, a bank acting as a sponsor could choose to provide the USU with phone access to a financial consultant. These can be represented as speed dial numbers in a switch as one implementation. When the user dials a certain speed dial number, the telecommunications service provider will know both the destination and the class of service that is being requested. The service provider may in some circumstances have that class of service available, or, on the other hand, may connect with its network management and provisioning system to request the available class of service in real time from a number of collaborating networks.

For example, an elderly indigent patient who would not have a telecommunications service of any kind because of credit problems can be provided with unanticipated high bandwidth services free of charge to the user. The user would have access to the highest bandwidth infrastructure approved by the sponsor or otherwise available, whether voice, data or multimedia services. The universal service user, who may never have received even basic POTS service, may now be able to receive unanticipated high bandwidth services. In this instance, a medical services provider may want to have home health care service staff provide in home diagnostic and monitoring services on video and multimedia lines that might easily be the equivalent of one or more DSL or optical lines activated and provisioned to the universal service user in real time on an incident-by-incident basis. The service would be paid by the party such as an insurer who would save money by providing the service in this manner and would thereby be motivated to be the sponsor of the wideband communication.

When the medical services provider wants to establish the connection of services, the initiator of the communication will be allowed to initiate the multimedia call, be intercepted and asked for a payment arrangement. In the case of a medical services provider, a third party such as an insurer or government agency may gladly pay for the high bandwidth services since it would be far less expensive than forcing the universal service user to spend days in a hospital where the diagnostic and monitoring services would otherwise be provided in what might be a less meaningful environment. However, the universal service provider will need to assess the request and determine the cost before requesting payment authorization or the provider would be forced to overcharge to be certain that costs are covered.

Determining this cost when the usage was not determined in advance, as opposed to purchasing an anticipated service that could be provisioned in a traditional lengthy time frame, would now be made possible by cost model based flow through provisioning that assesses the underlying cost of the universal service user's portion of the network, along with the core network of the universal service provider and any other network required to meet the need of the specific call. For example, in the case of long term video diagnostic services, "always on" DSL services do not allow for continued high bandwidth services because the service providers backbone networks are financially based on over subscription service assumptions.

An example of a flow-based steering and cost modeling system which may be used in connection with the present invention is disclosed in U.S. Pat. No. 6,249,519, to Rangachar, the entire disclosure of which is incorporated herein by reference. Software such as that disclosed by Rangachar, and other network monitoring software (e.g., HP Open View and MicroMuse NetCool, taken in conjunction with network activation software such as NetProvision, available from Syndesis), along with network and business process modeling software (such as Viryanet), may be used to allow the service provider to the universal or sponsored service user (USSU) caller, or calling party to the USSU, to have a real-time system that tracks what networks, network services and quality of services are available at which time and duration of time for a given cost and render a price for that service in real time to the requester so that the appropriate services and connections can be rendered. The request for these types of services can be indicated by either the destination number or the speed dial numbers that the sponsored user will choose in beginning the call.

Since the universal subscription multimedia caller is making a request for service not currently activated, the flow through provisioning may include a set of business rules that allow the universal service provider to ascertain the bandwidth, speed, date, length of time, and quality of service requested and assess the unique set of costs required by the specific network elements and the market demand on those elements at that specific time. The service provider can provide rates that reflect the demand placed on its network and the networks required to enable the ongoing connection. This price, which is preferably calculated at the time that a request for data service is made, may actually change from call to call, based on market and network usage.

Based on the real time quote by the universal service provider, an entity wishing to sponsor the universal service user's request can determine on an incident by incident basis whether or not to accept financial responsibility for the activation and usage of that particular service. This becomes especially useful when the connection being requested to the end user also requires connection to one or more third parties, who are also unanticipated as to bandwidth, services, and quality of services being required.

The present embodiment also makes it possible to accommodate sponsors who wish to provide services to users on a totally free basis where the services are also activated and agreed to be paid on an incident by incident basis. This would also allow for layered services, where one service is provided by one third party (such as the cost of the communication) and another service, such as content, is paid for by another third party.

Data or Multimedia Equivalent of Caller ID and Security Check

In accordance with an alternate embodiment, a caller ID type identification means is used in a data network, whether a PSTN, Internet or private network. The identification means acts as a data equivalent of ANI identifiers such as caller ID, by using digital signature or other encrypted means to provide secure identification so that data or video calls can be screened for acceptance and or charges.

The provider of a data or multimedia service can by this means direct all incoming communications to its servers and only pass on those communications that are preapproved and/or prefunded. This allows for a sponsor to provide totally free Internet or data services (or integrated voice and data services) to the user since the sponsor would be willing to fund certain types of communications or communications from approved sources. The sponsor could also request that a source that is not prepaid or preapproved, pay a usage fee to pass its communication to the sponsored user. The invention allows the sponsor to specify the parties they wish to sponsor, the parties they wish their user to contact, and the class of service the user may access, and or the applications they wish the user to have.

The sender of communication that is not approved would either have its mail or data packet bounced back until such time as it is approved, or could automatically negotiate the payment in real time with the sponsor, sponsor's agent or filter requiring payment.

Interaction and payment methods could be accomplished by use of prepaid cards or accounts, credit cards, charges to phone bills, or other traditional methods of submitting funds.

Sponsors and their users may employ a number of security provisions to make sure that unwanted communications are either blocked or rerouted. The security provisions may be one or more of the application services that the sponsor provides.

One method is to check to see whether the security feature(s), such as a digital signature is/are present. If not, the message can either be sent to a proxy, policy, or security server for inspection and processing, or rejected altogether.

Once accepted, the security information, such as PKI or digital signature information, is used in conjunction with a database of verified data, such as digital signatures or biometrics, which then makes use of the verified information to be presented to the user so that determinations can be made as to whether and how the call or request should be routed. In this respect, see below for services requests, follow me and follow or obtain my information services. The identification means preferably shows who the user is along with identifying information such as addresses, affiliations, and contact information. This information may then be compared to a second database which maintains other information from the caller so that the user can then determine whether to accept the communication, reroute it, or release information requested by it.

Follow Me Email, Data, Multi-media

These data identifiers make it possible for the message to be redirected or replicated to other locations. The secured and verifiable identifiers also make it possible for the transaction to be accomplished by proxy through business rules or other automated agents whose activities or services are paid by third parties whether public or private networks are used.

Often, a caller does not necessarily need to reach a person to hold a conversation, but, merely needs to obtain information. Given the proper security, these requests for information can be redirected and completed without requiring an in-person conversation. This is be an "obtain my information" service is possible because of the combination of the third party billing capability available with the secured identification capability built into the method. This helps provide screening and directory services in order to determine if the communication should be accepted, declined, redirected, or paid for by other parties. Obtain my information services might be provided to some parties who are approved by the sponsor with no additional charge while other services might be provided only if the calling party or some other sponsor agrees to pay. Information that is allowed to be provided may be identified as objects that are approved for use and those that are approved for payment as required.

Security Advantages

Since the caller is forced to make secure identification, the called party is generally more willing to accept the communication knowing that the caller is trusted or findable and prosecutable if necessary and, paid by a secure third party. This is useful in minimizing or blocking unwanted emails or communications likely to be contaminated with viruses. This also makes it possible to use the identification inherent in the digital signature or other encrypted elements used as identifiers to route the call whether or not it is in a header, or route the call if sent to an intelligent peripheral such as a proxy, policy, or security server which forwards or redirects the communication when it met the directory requirements for secured or approved communications.

The provision of secure voice, data, or multimedia services can be provided free of charge to users by one set of sponsors, such as local governments and or financial institutions, for some or all of its citizens, since local governments would save money by having secure applications available electronically. However, while sponsoring this portion of the service, the local government sponsor may or may not be the same sponsor who pays for the communication services themselves.

This provision of a sponsored application, such as a secure communication service such as a digital signature, PKI, or electronic notary public that verifies those communications, makes it possible for millions of Internet users to obtain these sponsored services at no cost. The overall cost to the local government is negligible to none since the cost of digital signatures or similar security feature can be brought down to a couple of dollars per user instead of a hundred dollars or so per user when extremely large numbers of users are brought into such a secure network. The incremental cost of the secure application could be paid by savings realized in other applications savings because of the efficiencies of electronic government and commercial transactions.

FIG. 11 illustrates the provision of the free application, the use of a secure Internet transaction, by the sponsor. In this case the sponsor is a local government or other electronic commerce participants, such as financial institutions serving businesses and consumers. Because the numbers of users are so large—in the millions—the costs are reduced by as much as 90%, making it possible to pay for the application out of the sponsor's savings. Because the local and state government agencies already have the information necessary to validate the citizens' identification, no new bureaucracy would be needed to manage the information.

An additional benefit of the present invention is that it makes communication systems such as the Internet less likely to be compromised by those who would attempt to use public networks as weapons of mass destruction.

The present embodiment further makes it possible for data transmissions that contain data, voice or multimedia to be transmitted as if they were traditional PSTN communications. These may also be used as tunneled communications within communications such as a virtual private network which has its own billing, directing, and security provisions. This allows for multiple services to be contained within a communication with multiple authentication and billing services to be attached to each as they are used.

This further makes it possible to create security throughout the network not just at a firewall point. With these securable identifiers, the identifiers could be checked throughout the stream of communications and routed for law enforcement uses, as well.

Secure and Verified Identifier as Follow Me or Follow My Information Service or Information Agents A further embodiment provides the ability for communicators to automatically populate directories that can provide up-to-the-moment location information, contactability status, and updated security information. This would allow services to be provided to the sponsored user at remote or changing locations. This location independent service would be a class of service that the sponsor would approve of ahead of time or could be requested in real time. In addition to connecting the user to services, users and sponsored users can communicate with each other through automated agents. This also allows communicators to communicate through intelligent agents which can communicate with each other and provide the information communicators need from each other without having to actually be interrupted with a communication that requires live voice interaction.

The incoming call can be a request for further data that does not require the actual called party to speak. But, given the securable identification of the calling party, the calling party identification can be used to determine what type of data can be shared with the calling party by means of business or communication rules once the calling party is authenticated and authorized.

The software of the invention allows the sponsor to make payment arrangements with the provider of the information so that a phone number in the case of a voice system, or a web or email address in the case of a data service, can be added to the data base of numbers that are allowed to be called. When the sponsored user chooses a given speed dial number, the software initiates the connection to the information provider. When the information provider is contacted, the information provider version of the software recognizes the sponsored service user as such and accepts the third party sponsor's payment arrangement. The information provider then supplies the information to the sponsored user and bills the account of the sponsor. Alternatively, if the information provider does not know of the sponsored user's status and requests payment for the service, the software will allow the sponsored user's account balance to pay for the information service. Alternatively, the software can allow or direct the sponsored user to then dial the sponsor and have the sponsor pay for the service either in real time, or through the sponsored user's account fund.

The software can make it impossible for the sponsored user to contact a restricted information provider's number since the number available to the user is a speed dial number that has been placed there by the sponsor. Being set up in advance, the sponsored user is allowed by the software to accept the charge of that information provider that is approved using the sponsored user's fund balance as the source of payment to the information provider.

The software can allow updates as requested by the sponsored user in real time by having the user contact the sponsor during or before a call session.

The software allows the charge to be made in any manner acceptable to the sponsor such as the sponsor's phone bill, prepaid account, or credit card. If during the communication session, the software enables the sponsored user to launch an additional request as if it were an additional call to a third party for an additional information service that can be similarly charged against the sponsored user's account balance.

Layered, Tunneled Billing or Sponsored Billing

Another advantage of third-party billing capabilities for data or multimedia calls includes the ability to have layered billing so that a sponsor can provide free transport to the user while one or more third party sources pay for separate services or layers of services for the user.

The calling party may be making the call with a caller ID, or a data or multi-media communication with a digital signature verifying identity and billing relationship to a third party who will pay for the underlying communication. Within that communication may be additional communications or transactions for services paid by other parties whose relationships to the caller are different. For example, a bank may sponsor free connectivity subscriptions for a user while charging a third party for financial services such as crediting payments for services. Each additional service or layer of services may be billed to different parties and the specific relationship could support its own digital signature.

A universal service user may have a digital signature or other security measure with a sponsoring communications provider that is different from the caller's relationship with an employer, or government agency providing services. This way, the caller may create a secured relationship with an entity without compromising privacy, security, or data base integrity interests of the other party. An example of how wireless data sponsored service is provided is in the instance where any service can be paid by the sponsor with the optional features of providing white listed sites and addresses with whom the sponsored party can communicate.

Service providers often allocate bandwidth available to any one user covered by a base station, head end, switch, or other aggregation point based on price. Some of the bandwidth, instead of being sold to users, can instead be reserved for sponsored users where the price for the service is paid by the sponsor. A sponsor may work with a local service provider who offers the bulk of bandwidth for sale to users while reserving a percentage of the bandwidth as free service to those the sponsor wishes to support. An example might be reserving a percentage of a low power free space optics FM radio channel devoted for data communications for users who pay little or nothing for services that might reach schools, non profit organizations and governments. This service would be free to the sponsored user, but, could be limited so that the user, if able, would be encouraged to pay for additional services beyond what is white listed by the sponsor. The sponsor could even be the service provider.

As in the process steps outlined, when the sponsored user wishes to make data communications, the service provider authenticates that the user is an authorized user, in this case, a sponsored user. The service provider also determines if the class of service or address, entity, or person with whom the sponsored user wishes to communicate is approved by the sponsor. If not approved, the sponsor is contacted to see if the new use would be approved. Similarly, if funds have run out, the sponsor can be contacted to see if additional funds would be allocated for use by the sponsored user. If the action is approved and the funding is approved, then the user can complete data communications that are paid by the sponsor.

This approach makes it possible for internet services to be provided for school children free of charge or for similar universal service applications described herein.

Thus, there has been disclosed a significantly improved system and method for controlling access and billing to provide universal local and distance telephone service, as well as access to other communications networks. While the invention has been particularly shown and described with reference to a preferred embodiment thereof, it will be understood by those skilled in the art that various changes in form and details may be made therein without departing from the spirit and scope of the invention.

The embodiments of the invention in which an exclusive property or privilege is claimed are defined as follows:

1. A method of operating a telecommunications device, comprising the steps of:

detecting an incoming call or data message from a calling party to a called party;

using a called number or identifier to determine whether said called party is a universal service user for whom service is provided at no charge or substantially no charge; and using a called number or identifier to determine the quality level of connecting to a flow-based steering and cost modeling system approved for a user.

2. The method of claim 1, further comprising the step of generating and sending a message to the calling party offering participation as a sponsor for the current and subsequent calls of this type for the sponsored party.

3. The method of claim 1, further comprising the step of using the calling number or identifier to determine the quality level of sponsored service approved for that sponsored party.

4. The method of claim 1, further comprising the step of generating and sending a message to a sponsor offering participation as a sponsor for subsequent calls and communications.

5. The method of claim 1, further comprising the step of using codes and speed dial numbers for allowed calling parties access only to those called parties allowed by a sponsor to be contacted and only using those services provided to users by the sponsor or sponsors.

6. The method of claim 1, further comprising the step of using a calling number to determine, as necessary, the location of the calling party needing services and/or additional funding so that a request for additional services and/or funds can be made.

7. The method of claim 1, further comprising the step of generating and sending a message to the calling party requesting authorization to charge said calling party an additional fee for connecting an additional party.

8. The method of claim 1, further comprising the step of using calling number or identifier, to provide free security applications including free digital signatures, PKI, biometrics, or encryption services.

9. The method of claim 1, further comprising the step of using an individual identifier, PIN number, biometric, digital signature or secure means of identification, to determine whether the calling party is a universal service for whom service is provided at no charge.

10. The method of claim 1, wherein the step of using a telecommunications device comprises the step of using an intelligent peripheral connected to a central office switching system.

11. The method of claim 1, wherein the step of using a telecommunications device comprises using a tandem switch, a central office switch, a cable television network, a satellite system, an intelligent user device comprising a phone, computer, or monitoring device with either routing or switching capabilities built into it, a private network switch, a PBX, a wireless PBX, a virtual PBX, a virtual private network, an intelligent peripheral connected to an identification verification service, a network device for wireline local loop service or private network connections, a network device for wireless local loop service and attendant automatic location information, a network device for wireline long distance service whether over public or private networks, or an account selected from the group consisting of a telecommunications account, phone card account or virtual phone card account, which allows the sponsored user to be identified separately from or in addition to a specific telecommunications device.

12. The method of claim 1, further comprising the step of allowing a third party to restrict the communicating parties that are available to the sponsored user by entering the phone numbers, e-mail addresses, or websites of the allowed communicating parties into a database, directory or repository.

13. The method of claim 1, further comprising the step of determining whether the called party is a universal service user using a secure identifier, wherein the secure identifier comprises a PIN code, digital signature, pseudo-random number generator, biometric or video transmission.

14. The method of claim 1, further comprising the step of restricting by a sponsor through the use of codes the availability of services or products, the quality of services or products, the duration of services or products, the bandwidth, and/or the availability of applications.

15. A method of operating a telecommunications device, comprising the steps of:

detecting an incoming call or data message from a calling party to a called party;

using a called number or identifier to determine whether said called party is a universal service user for whom service is provided at no charge or substantially no charge; and generating and sending a message to said calling party offering participation as a sponsor for the current and subsequent calls of this type for the sponsored party.

16. The method of claim 6, further comprising the step of using a calling number or identifier to determine the quality level of sponsored service approved for that sponsored user.

17. The method of claim 6, further comprising the step of using codes and speed dial numbers for allowed calling parties access only to those called parties allowed by sponsors to be contacted and only using those services provided to users by the sponsor or sponsors.

18. A method of operating a telecommunications device, comprising the steps of:

detecting an incoming call or data message from a calling party to a called party;

using a called number or identifier to determine whether said called party is a universal service user for whom service is provided at no charge or substantially no charge; and generating and sending a message to a sponsor offering participation as a sponsor for subsequent calls and communications.

19. The method of claim 18, further comprising the step of using a calling number or identifier to determine the quality level of sponsored service approved for that sponsored user.

20. The method of claim 18, further comprising the step of using codes and speed dial numbers for allowed calling parties access only to those called parties allowed by sponsors to be contacted and only using those services provided to users by the sponsor or sponsors.

* * * * *